(12) United States Patent
Young et al.

(10) Patent No.: US 12,058,784 B2
(45) Date of Patent: Aug. 6, 2024

(54) THERMAL IMMERSION CIRCULATOR

(71) Applicant: Breville USA, Inc., Torrance, CA (US)

(72) Inventors: Christopher Charles Young, Seattle, WA (US); Tom Udd, Sultan, WA (US); Marc Ian Feifel, Seattle, WA (US); Kevin Finke, Everett, WA (US); Cameron Jue, Seattle, WA (US)

(73) Assignee: Breville USA, Inc., Torrance, CA (US)

( * ) Notice: Subject to any disclaimer, the term of this patent is extended or adjusted under 35 U.S.C. 154(b) by 180 days.

(21) Appl. No.: 17/505,366

(22) Filed: Oct. 19, 2021

(65) Prior Publication Data

US 2022/0039207 A1   Feb. 3, 2022

Related U.S. Application Data

(63) Continuation of application No. 16/093,612, filed as application No. PCT/US2016/057205 on Oct. 14, 2016, now Pat. No. 11,259,367.
(Continued)

(51) Int. Cl.
*H05B 1/02* (2006.01)
*A47J 27/10* (2006.01)
(Continued)

(52) U.S. Cl.
CPC ............. *H05B 1/0297* (2013.01); *A47J 27/10* (2013.01); *B01F 33/862* (2022.01);
(Continued)

(58) Field of Classification Search
CPC ...... H05B 2203/021; H05B 3/80; H05B 3/42; H05B 3/58; H05B 1/0283; H05B 1/0244; H05B 1/0247; H05B 1/0252; H05B 1/0261; H05B 1/0297; H05B 2203/013; H05B 3/34; H05B 3/40; H05B 3/44; H05B 3/48;
(Continued)

(56) References Cited

U.S. PATENT DOCUMENTS 5,750,960 A   5/1998   Bresolin et al.
5,862,303 A   1/1999   Adar et al.
(Continued)

FOREIGN PATENT DOCUMENTS

CN   101217914 A   7/2008
CN   101883510 A   11/2010
(Continued)

OTHER PUBLICATIONS

Chinese Office Action, dated Aug. 20, 2020, for Chinese Application No. 20168007384.1, 11 pages.
(Continued)

*Primary Examiner* — Chris Q Liu
(74) *Attorney, Agent, or Firm* — KDW Firm PLLC

(57) ABSTRACT

A thermal immersion circulator can comprise a heater including a hollow cylindrical main body having an inlet opening at a first end thereof and an outlet opening in a side wall thereof. The heater can include a flexible circuit board having a plurality of resistive bands controlled by controlling electronics such as TRIACs, which can be water-cooled. A thermal immersion circulator including such a heater can be used in scientific laboratories or sous vide food cooking.

11 Claims, 23 Drawing Sheets

Related U.S. Application Data

(60) Provisional application No. 62/242,864, filed on Oct. 16, 2015.

(51) Int. Cl.
| | |
|---|---|
| *B01F 33/00* | (2022.01) |
| *B01F 35/41* | (2022.01) |
| *B01L 7/00* | (2006.01) |
| *H05B 3/34* | (2006.01) |
| *H05B 3/42* | (2006.01) |
| *H05B 3/44* | (2006.01) |
| *H05B 3/80* | (2006.01) |

(52) U.S. Cl.
CPC .............. *B01F 35/413* (2022.01); *B01L 7/00* (2013.01); *H05B 1/0244* (2013.01); *H05B 1/0247* (2013.01); *H05B 1/0252* (2013.01); *H05B 3/34* (2013.01); *H05B 3/42* (2013.01); *H05B 3/44* (2013.01); *H05B 3/80* (2013.01); *B01L 2300/1827* (2013.01); *H05B 2203/013* (2013.01); *H05B 2203/021* (2013.01)

(58) Field of Classification Search
CPC ... H05B 3/60; H05B 3/68; H05B 3/78; H05B 3/82; H05B 6/1209; A47J 27/10; A47J 36/321; A47J 27/18; A47J 36/2405; A47J 2202/00; A47J 2203/00; A47J 27/004; A47J 27/04; A47J 27/0802; A47J 36/00; A47J 36/165; A47J 36/20; A47J 36/32; A47J 37/1257; A47J 37/1266; A47J 43/044; A47J 43/082; A47J 45/068
USPC ....... 219/523, 438, 494, 506, 510, 543, 544, 219/553; 99/330, 325, 331, 342, 344
See application file for complete search history.

(56) References Cited

U.S. PATENT DOCUMENTS

| | | | |
|---|---|---|---|
| 6,015,434 A | * | 1/2000 | Yamane .............. A61M 60/419 623/3.13 |
| 8,173,940 B2 | | 5/2012 | Wang et al. |
| 8,328,549 B2 | | 12/2012 | Galati et al. |
| 2004/0256375 A1 | | 12/2004 | Loktev et al. |
| 2013/0220143 A1 | | 8/2013 | Fetterman et al. |
| 2015/0016811 A1 | | 1/2015 | Flint |
| 2015/0082996 A1 | | 3/2015 | Wu |
| 2015/0150403 A1 | | 6/2015 | Wu et al. |

FOREIGN PATENT DOCUMENTS

| | | |
|---|---|---|
| CN | 102791460 A | 11/2012 |
| CN | 104094508 A | 10/2014 |
| CN | 104620672 A | 5/2015 |
| EP | 2767159 A1 | 8/2014 |
| FR | 2775412 A1 | 8/1999 |
| JP | 2001250664 A | 9/2001 |
| JP | 2006005070 A | 1/2006 |
| WO | 2004/034742 A1 | 4/2004 |
| WO | 2012/092641 A1 | 7/2012 |
| WO | 2015/018950 A1 | 2/2015 |
| WO | 2017/066692 A1 | 4/2017 |

OTHER PUBLICATIONS

European Search Report, dated May 9, 2019, for European Application No. EP 16 856 357, 10 pages.

International Search Report and Written Opinion, dated Jan. 25, 2017, for International Application No. PCT/US2016/057205, 13 pages.

\* cited by examiner

THERMAL IMMERSION CIRCULATOR

PRIORITY CLAIM

This application is a continuation of U.S. patent application Ser. No. 16/093,612, entitled "THERMAL IMMERSION CIRCULATOR" and filed on Oct. 12, 2018, which is the U.S. National Phase Patent Application of PCT International Patent Application No. PCT/US2016/057205, entitled "THERMAL IMMERSION CIRCULATOR" and filed on Oct. 14, 2016, which claims priority to U.S. Provisional Patent Application No. 62/242,864 entitled "THERMAL IMMERSION CIRCULATOR" and filed on Oct. 16, 2015. The contents of the above-identified applications are incorporated herein by reference in their entirety.

BACKGROUND

Technical Field

The present disclosure generally relates to an electrically powered thermal immersion circulator to heat various fluids.

Description of the Related Art

Thermal immersion circulators can be used to circulate and heat various fluids, such as to maintain a body of the fluid at an accurate and stable temperature. A thermal immersion circulator can include a pump or other mechanism to circulate the fluid, and a heating element to heat the fluid. Thermal immersion circulators have been used in applications such as scientific or other laboratories, and in kitchens, in particular, for sous vide cooking.

BRIEF SUMMARY

A thermal immersion circulator may be summarized as including: a heater including: a main body having a tubular side wall, a first end, a second end spaced from the first end across a length of the main body, the tubular side wall which forms a fluid flow passage at least partially therethrough, the main body having an inlet at least proximate the first end, the inlet which provides fluid communication between the fluid flow passage in an interior of the main body and an exterior of the main body, and an outlet in the tubular side wall, at least a portion of the outlet spaced relative toward the second end with respect to at least a portion of the inlet, the outlet which provides fluid communication between the fluid flow passage in the interior of the main body and the exterior of the main body; a heating element physically coupled to and wrapped at least partially about at least a portion of the tubular side wall of the main body; and a switch electrically coupled to control the heating element and physically and thermally conductively coupled to the tubular side wall of the main body; and a housing sized and dimensioned to receive at least a portion of the heater.

An entirety of the outlet may be spaced relatively closer to second end than an entirety of the inlet. An entirety of the heating element may be located between the inlet and the outlet. The tubular side wall may form the inlet at the first end. The tubular side wall may have a central axis, the inlet radially disposed about the central axis, and the outlet extending parallel and radially spaced from the central axis of the tubular sidewall. An entirety of the heating element may be located between an entirety of the inlet and an entirety of the outlet. The outlet may be an oblong slot in the tubular side wall. The tubular side wall may have an upper portion and a lower portion, the upper portion having a flat surface upon which the switch is physically and thermally conductively mounted. The lower portion of the tubular side wall may be cylindrical. The heating element may be wrapped angularly about at least three quarters of a circumference of the tubular side wall. An entirety of the heating element may be located between an entirety of the inlet and an entirety of the outlet. The switch may be an encapsulated TRIAC.

The thermal immersion circulator may further include a motor mounted at least proximate the second end of the main body. The thermal immersion circulator may further include an impeller positioned inside the tubular main body. The thermal immersion circulator may further include a shaft that physically couples the motor to the impeller. The impeller may be positioned closer to the inlet than to the outlet. The thermal immersion circulator may further include a support including a boss to receive a strain relief of a power cord and a groove to receive a spring clip, wherein the support, the boss, and the groove are formed from a single piece of integral material.

A heater for a thermal immersion circulator may be summarized as including a main body having a tubular side wall, a first end, a second end spaced from the first end across a length of the tubular main body, the tubular side wall which forms a fluid flow passage at least partially therethrough, the main body having an inlet at least proximate the first end, the inlet which provides fluid communication between the fluid flow passage in an interior of the main body and an exterior of the main body, and an outlet in the tubular side wall, at least a portion of the outlet spaced relative toward the second end with respect to at least a portion of the inlet, the outlet which provides fluid communication between the fluid flow passage in the interior of the main body and the exterior of the main body; a heating element physically coupled to and wrapped at least partially about at least a portion of the tubular side wall of the main body, an entirety of the heating element located between the inlet and the outlet; and a switch electrically coupled to control the heating element and physically and thermally conductively coupled to the tubular side wall of the main body.

An entirety of the outlet may be spaced relatively closer to second end than an entirety of the inlet. The tubular side wall may form the inlet at the first end. The tubular side wall may have a central axis, the inlet radially disposed about the central axis, and the outlet extending parallel and radially spaced from the central axis of the tubular sidewall. The outlet may be an oblong slot in the tubular side wall. The tubular side wall may have an upper portion and a lower portion, the upper portion having a flat surface upon which the switch is physically and thermally conductively mounted. The lower portion of the tubular side wall may be cylindrical and have a circumference, and the heating element may be wrapped angularly about at least three quarters of the circumference of the tubular side wall. The heating element may be wrapped angularly about at least three quarters of a perimeter of the tubular side wall.

A thermal immersion circulator may be summarized as including: a heater including: a main body having a tubular side wall, a first end, a second end spaced from the first end across a length of the main body, the tubular side wall which forms a fluid flow passage at least partially therethrough, the main body having an inlet at least proximate the first end, the inlet which provides fluid communication between the fluid flow passage in an interior of the main body and an exterior of the main body, and an outlet at least proximate the second end, the outlet which provides fluid communication between the fluid flow passage in the interior of the main body and the exterior of the main body; a heating element physically coupled to and wrapped at least partially about at least a portion of the tubular side wall of the main body; and a switch electrically coupled to control the heating element and physically and thermally conductively coupled to the tubular side wall of the main body; and a housing sized and dimensioned to receive at least a portion of the heater, the housing including a tubular side wall and an opening formed in the tubular side wall of the housing, the opening in fluid communication with the outlet of the main body.

A heater for a thermal immersion circulator may be summarized as including: a main body having a tubular side wall, a first end, a second end spaced from the first end across a length of the tubular main body, the tubular side wall which forms a fluid flow passage at least partially therethrough, the main body having an inlet at least proximate the first end, the inlet which provides fluid communication between the fluid flow passage in an interior of the main body and an exterior of the main body, and an outlet in the tubular side wall, at least a portion of the outlet spaced relative toward the second end with respect to at least a portion of the inlet, the outlet which provides fluid communication between the fluid flow passage in the interior of the main body and the exterior of the main body; a heating element physically coupled to and wrapped at least partially about at least a portion of the tubular side wall of the main body, an entirety of the heating element located between the inlet and the outlet; and a switch electrically coupled to control the heating element and physically and thermally conductively coupled to the main body. A thermal immersion circulator may be summarized as including a heater; an inlet having a central longitudinal axis and an entrance curved at least partially around the central longitudinal axis, the inlet having a height; and a power cord electrically coupled to the heater, the power cord having a diameter smaller than the height to fit snugly within the entrance and engage the entrance in an interference fit.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

As used herein, "above" and "below," "top" and "bottom," "vertical" and "horizontal," and other similar terms refer solely to the relative positions of components as they are illustrated in the Figures and are intended to convey their ordinary meaning within the context of the Figures. In some embodiments, these terms can carry their ordinary meaning within the context of real-world implementations, for example, such that gravity pulls an item from a first location above a second location toward the second location. Use of these terms alone, however, is not intended to convey that a first component described as being above another component within the context of the Figures is necessarily above that component in a real-world implementation.

As used herein, "coupled," "connected," and other similar terms, when used alone, mean physically coupled or physically connected. Components that are electrically or otherwise "coupled" or "connected" are described as such.

Figure 1:
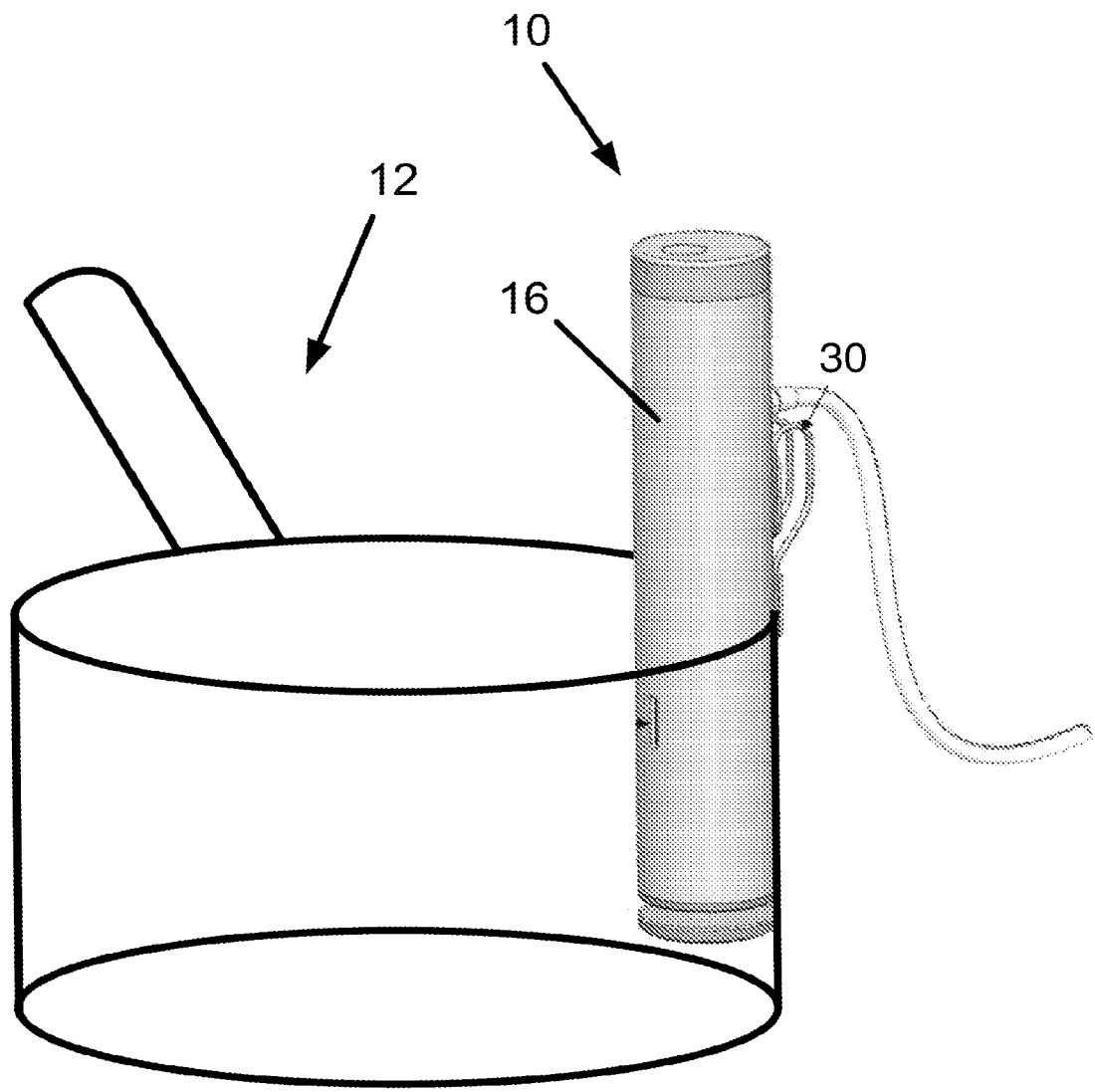
FIG. 1 illustrates a thermal immersion circulator positioned in a pot, according to at least one illustrated embodiment.
Figure 22:
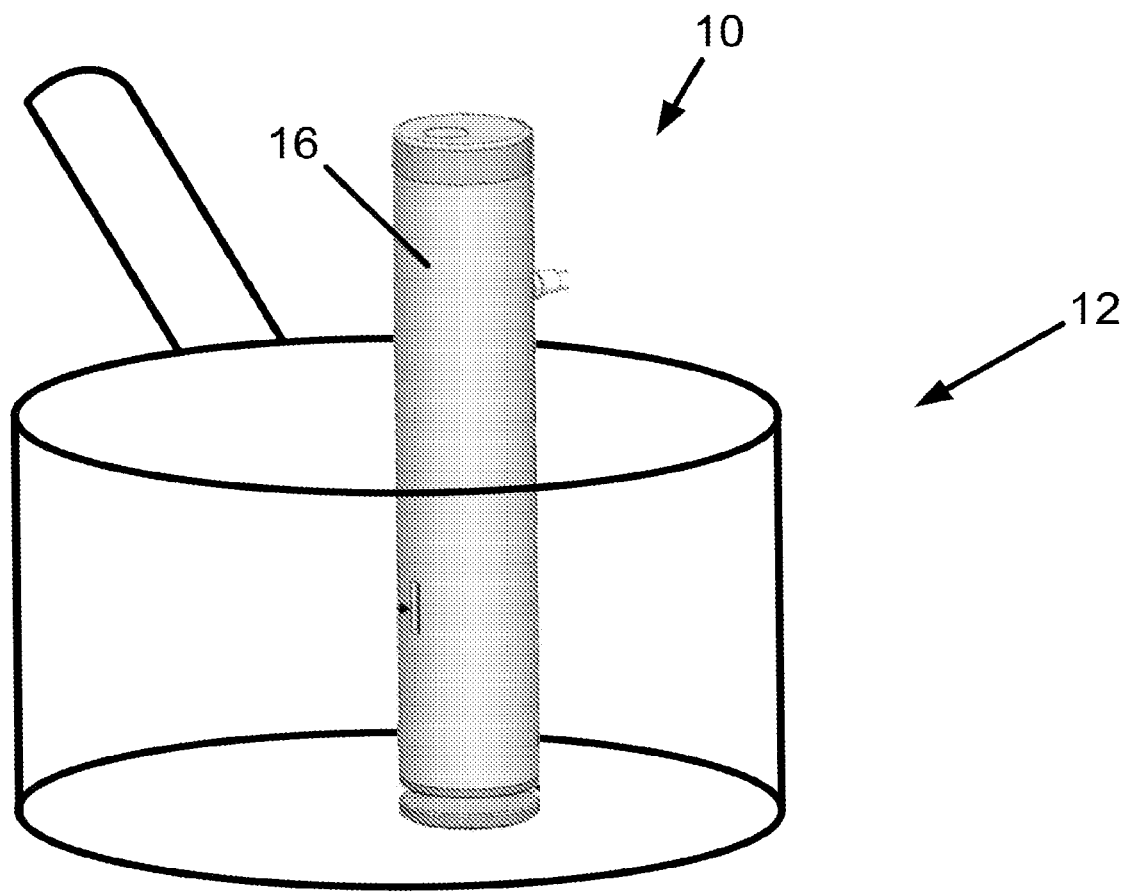
FIG. 22 illustrates a thermal immersion circulator positioned in a pot, according to at least one illustrated embodiment.
Figure 23:
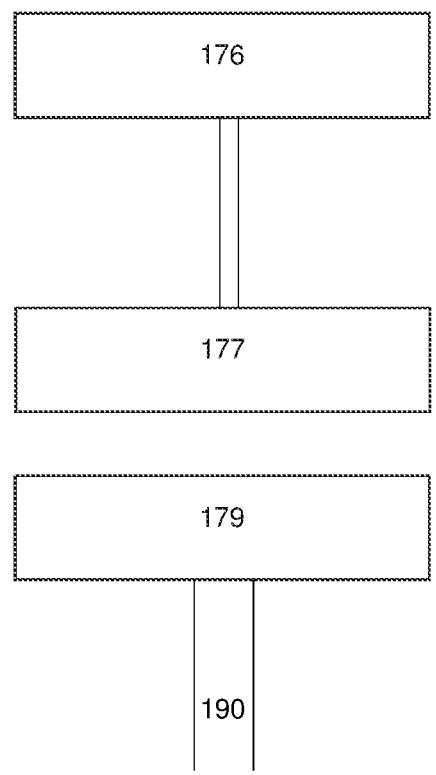
FIG. 23 depicts an implementation that includes magnetic coupling, according to at least one illustrated embodiment.

FIG. 1 shows a thermal immersion circulator 10 positioned in a container, vessel, or pot 12. The pot 12 can hold a body of water or another fluid for cooking food, and the thermal immersion circulator 10 can be used to heat up, maintain a temperature of, or circulate the fluid within the pot. The thermal immersion circulator 10 can be used for sous vide cooking. The thermal immersion circulator 10 can be positioned to stand upright in the pot on a bottom end of the thermal immersion circulator 10 (as shown in FIG. 22), or can be clipped, clamped, or otherwise attached onto the rim or side of the pot 12, as desired based on the size of the pot 12, the depth of the fluid in the pot 12, etc. The thermal immersion circulator 10 can include a waterproof housing 16 which protects circuitry therein so the thermal immersion circulator 10 can be safely submerged in water. The housing 16 can be opaque.

Figure 2:
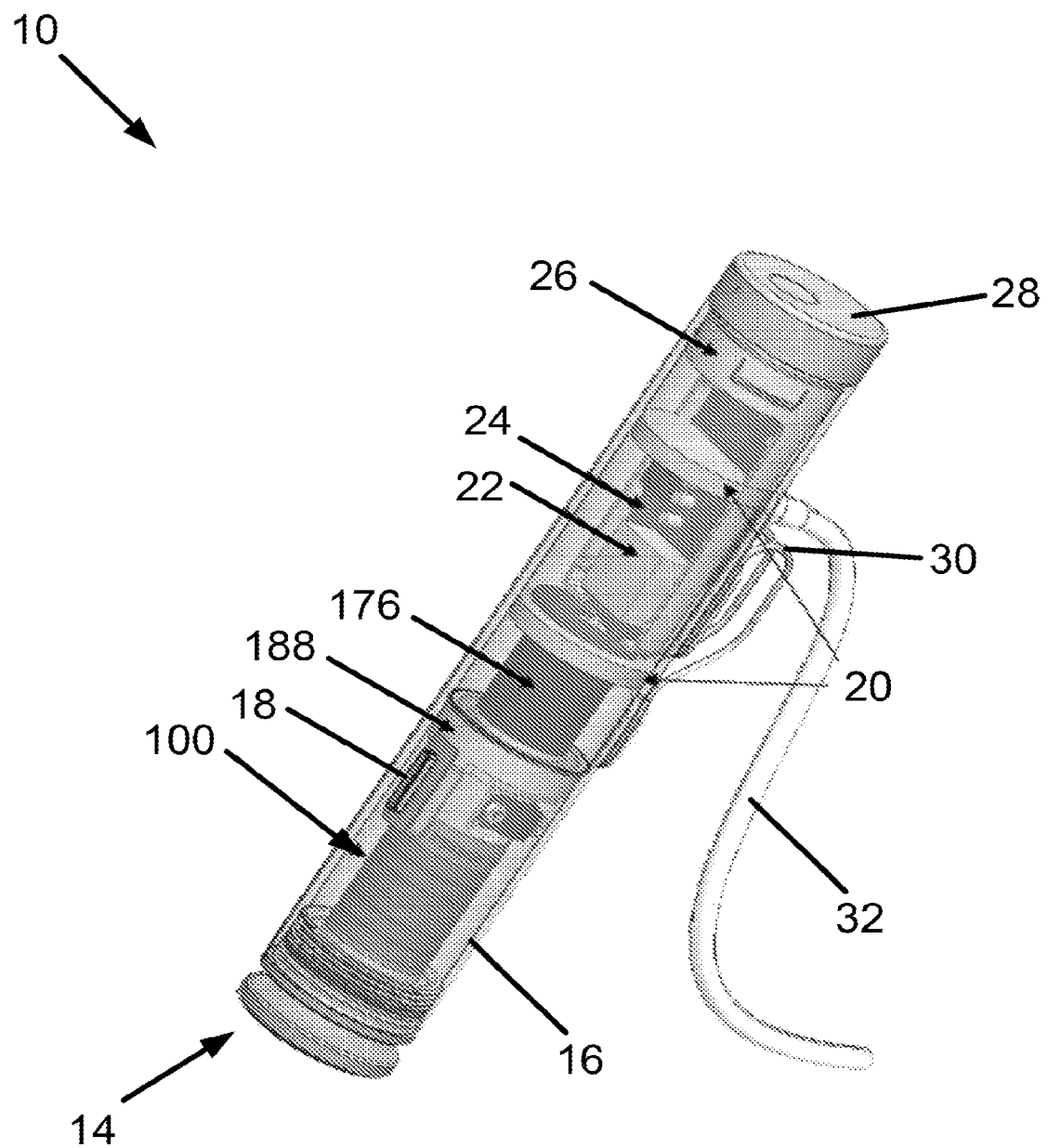
FIG. 2 is a three-dimensional rendering in a perspective view of the thermal immersion circulator of FIG. 1, with a housing of the thermal immersion circulator illustrated as transparent to show internal components of the thermal immersion circulator, according to at least one illustrated embodiment.

FIG. 2 shows the thermal immersion circulator 10, with the housing 16 shown as transparent to illustrate various internal components of the thermal immersion circulator 10. The thermal immersion circulator 10 can include a lower inlet assembly 14 having a flat bottom surface on which the thermal immersion circulator 10 can stand, such as in the pot 12. In some implementations, the flat bottom surface can include a magnet (e.g., similar to the magnet 308 illustrated in FIG. 21 and described further below) to help maintain the position of the thermal immersion circulator 10 within the pot 12. The lower inlet assembly 14 can have a peripheral, radial opening through which a fluid can be drawn into, or through which a fluid can be expelled from, an interior of the thermal immersion circulator 10.

The thermal immersion circulator 10 can also include a heater 100, which is described in greater detail below. A bottom end of the heater 100 can be coupled to the lower inlet assembly 14 so that an internal conduit or passage through the heater 100 is in fluid communication with the peripheral opening of the inlet assembly 14. The housing 16 can include an opening 18 formed in a side wall of the housing 16, through which a fluid can be drawn into, or through which a fluid can be expelled from, the interior of the thermal immersion circulator 10. A side surface of the heater 100 can be coupled to the opening 18 so that the internal conduit through the heater 100 is in fluid communication with the opening 18, such as through an opening or slot 126 in a side of the heater 100 and a passageway 180 through a spacer 178, as described in greater detail below. In alternative embodiments, the top of the heater 100 can be coupled to the opening 18 so that the internal conduit through the heater 100 is in fluid communication with the opening 18, such as through an opening in the top of the heater 100.

The thermal immersion circulator 10 can include upper and lower thermal isolation barriers 20, which can separate the thermal immersion circulator 10 into distinct thermal regions or chambers. For example, the lower thermal isolation barrier 20 can separate the heater 100 from other electrical components of the thermal immersion circulator 10 positioned above the lower thermal isolation barrier 20, such as a Hi-Temp transformer 22 and a PCBA (Printed Circuit Board Assembly) 24 mounted within an electronics module housing 26. The thermal immersion circulator 10 can also include a top cap assembly 28 to cap the top end of the housing 16. The thermal immersion circulator 10 can also include a removable clip 30, such as to clip the thermal immersion circulator 10 to the side of the pot 12, such as to mount the thermal immersion circulator 10 to a side of the pot 12 so that a power cord 32 is not submerged. The power cord 32 can be used to plug the thermal immersion circulator 10 into a standard wall socket to draw power from a power grid. The removable clip 30 can be used to clip the thermal immersion circulator 10 to pots of various sizes and shapes, such as to pot sides having various radii of curvature.

Figure 3:
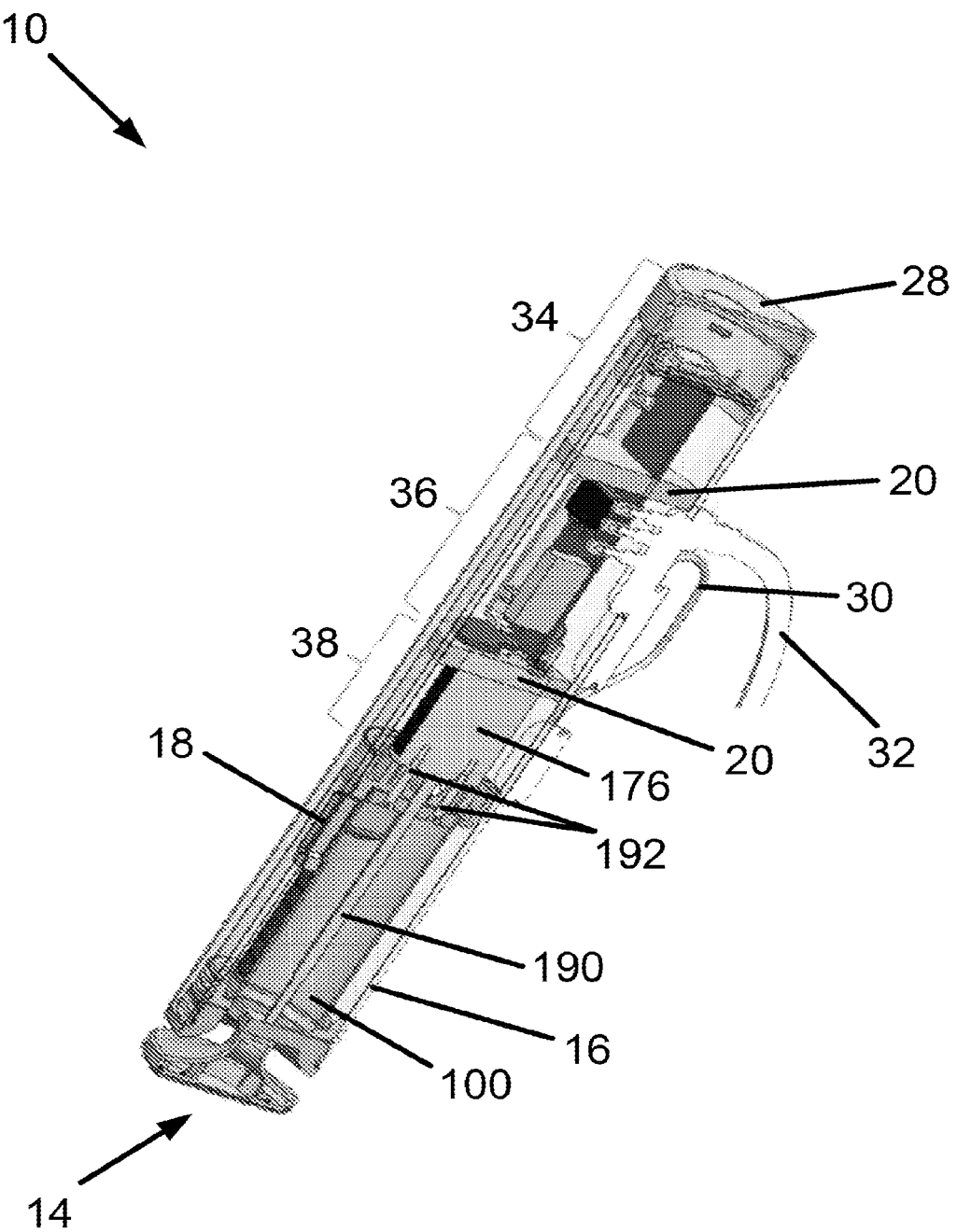
FIG. 3 is a cross-sectional view of the thermal immersion circulator as shown in FIG. 2, according to at least one illustrated embodiment.

FIG. 3 shows the thermal immersion circulator 10 in cross-section. The thermal isolation barriers 20 divide the interior of the thermal immersion circulator 10 into three distinct thermal zones: a first, upper PCBA zone 34 which can operate at temperatures at or around 70° C., a second, lower PCBA zone 36 which can operate at temperatures at or around 100° C., and a third, motor zone 38 which can operate at temperatures at or around 100° C. The lower inlet assembly 14 can be removable from the rest of the thermal immersion circulator 10, for example, to facilitate cleaning of the heater 100. Similarly, the top cap assembly 28 can be removable from the rest of the thermal immersion circulator 10, for example, to facilitate access to and repair of the electrical components housed therein.

Figure 4:
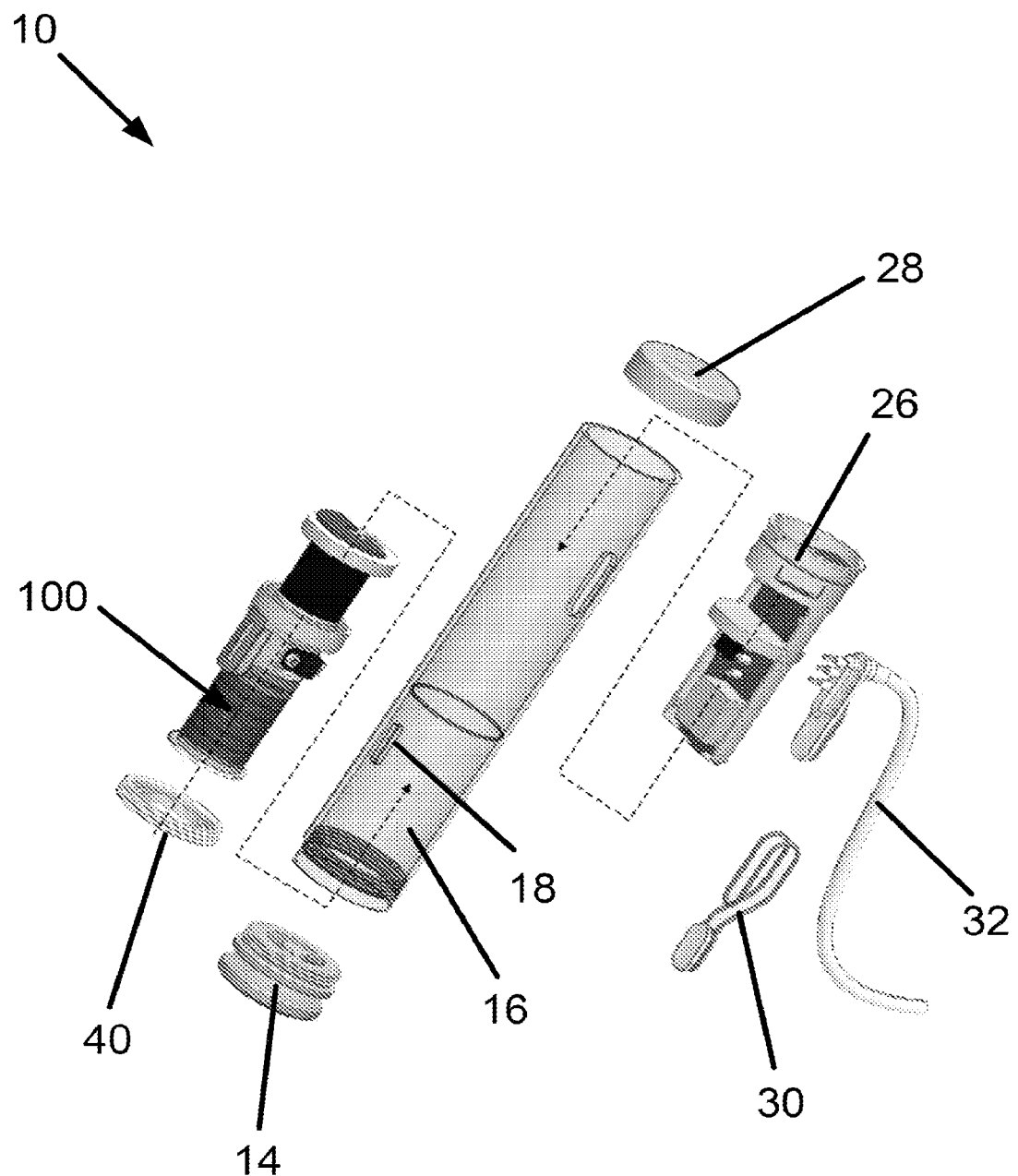
FIG. 4 is an exploded view of the thermal immersion circulator as shown in FIG. 2, according to at least one illustrated embodiment.

FIG. 4 shows the thermal immersion circulator 10 in an exploded view, and illustrates methods of assembling the thermal immersion circulator 10. For example, a method of assembling the thermal immersion circulator 10 can include, possibly, but not necessarily in the following order: inserting the heater 100 into the housing 16, then securing the heater 100 within the housing 16 using a coupling nut 40, then inserting an electronics module including the electronics module housing 26 into the housing 16, then coupling the power cord 32 to the electronics module through the housing 16, then connecting and securing the top cap assembly 28 to the housing 16, then attaching the lower inlet assembly 14 to the housing 16, heater 100, and coupling nut 40, then attaching the clip 30 to the housing 16.

Figure 5:
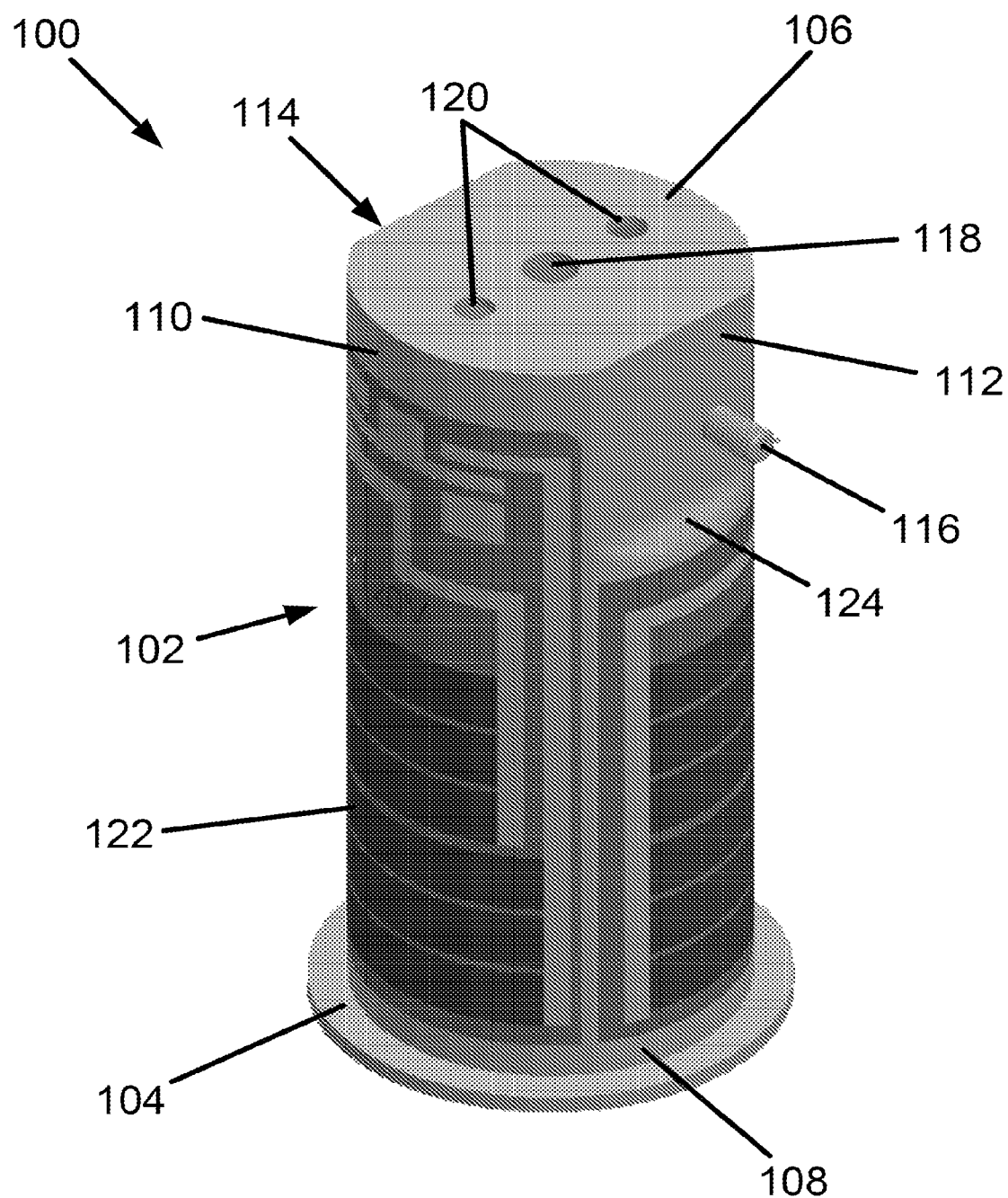
FIG. 5 is a three-dimensional rendering in a perspective view of a heater for use in a thermal immersion circulator, according to at least one illustrated embodiment.

FIG. 5 shows the heater 100 that can be used in a thermal immersion circulator such as the thermal immersion circulator 10. The heater 100 includes a hollow, substantially cylindrical, main body 102 having a tubular side wall and an annular cross-sectional shape, a radial flange, foot, or ridge 104 coupled to a bottom end portion of the main body 102, and a bulkhead, or barrier, or partition 106 coupled to a top end portion of the main body 102. In alternative embodiments, the main body 102 can have a generally circular, elliptical, rectangular, square, triangular, or other suitable cross-sectional shape. The main body 102, the flange 104, and the bulkhead 106 can be formed from a single, integral, unitary piece of material, or they can be formed from separate pieces of material coupled to one another by any of various known techniques. In other embodiments, the heater 100 can be fabricated without the flange 104.

The main body 102, the flange 104, and the bulkhead 106 can be formed from any of various suitable materials, such as any suitable metal (e.g., polished stainless steel, copper, or aluminum), plastic (e.g., thermosetting plastics), ceramic, porcelain, etc., and these components can be made from the same material(s) or from different materials as one another. The main body 102, flange 104, and bulkhead 106 can also be coated with non-stick materials. The materials can be electrically conductive or non-electrically conductive, heat-conductive or non-heat-conductive, and have sufficient strength and temperature tolerances to provide the heater 100 with rigidity and structure at temperatures across the intended working range of the heater 100. Use of metallic materials such as stainless steel provides the heater 100 with very smooth surfaces and allows the heater 100 to be easily and rapidly cleaned.

The main body 102 includes a hollow cylindrical bottom portion 108 having an interior surface 130 and an exterior surface 132 (see FIG. 10) each having a circular cross-sectional shape. The main body 102 also includes a top portion 110 that is substantially cylindrical and has a first, left side flat wall 112 and a second, right side flat wall 114. The left side wall 112 is positioned opposite to the right side wall 114 across the top portion 110 of the main body 102, such that the left side wall 112 is parallel to the right side wall 114. The top portion 110 is hollow and has an interior surface 134 and an exterior surface 136 (see FIG. 9) each having circular cross-sectional shapes truncated by the left side wall 112 and by the right side wall 114.

A pair of protrusions such as threaded studs 116 (only one is visible in FIG. 5) can be coupled to and/or extend from the top portion 110 of the main body. For example, a first threaded stud 116 can extend radially away from and perpendicular to the left side wall 112, and a second threaded stud 116 can extend radially away from and perpendicular to the right side wall 114. The threaded studs 116 can include solid cylindrical protrusions having threads on an exterior surface thereof. Further, a flexible circuit board 122 is coupled to the exterior surface of the main body 102, including to the exterior surface 132 of the bottom portion 108 and to the exterior surface 136 of the top portion 110 of the main body 102. The flexible circuit board 122 is a thick-film flexible circuit board 122, as described in greater detail below, but other implementations can use a thin-film flexible circuit board, a thin-film resistive heater, a thick-film resistive heater, a wire-wrapped heater, a flexible polyamide, or other similar technologies, instead.

The radial flange 104 has an annular shape, with an outer diameter of the flange 104 being greater than an outer diameter of the main body 102. In some implementations, an inner diameter of the flange 104 can match an inner diameter of the main body 102, such that the flange 104 can be coupled to a bottom end of the main body 102, leaving an interior 128 (see FIGS. 9-10) of the main body 102 flush with an interior surface of the flange 104. In other implementations, the inner diameter of the flange 104 can match the outer diameter of the main body 102, such that the flange 104 can be coupled to the exterior surface 132 of the bottom portion 108 of the main body 102 at a bottom end thereof. The flange 104 can be formed from a single flat plate of material, such as by cutting a circular opening in a flat circular piece of material. Thus, the flange 104 can have a rectangular cross-sectional shape along a vertical plane. The flange 104 can form one part of a seal between the heater 100 and another component of a thermal immersion circulator of which the heater 100 is a part. In some implementations, the main body 102 and the radial flange 104 can be formed unitarily, such as in a single molding process, such as in a single metal injection molding process.

The bulkhead 106 has a truncated-circular shape matching the truncated-circular shape of the top portion 110 of the main body 102. In some implementations, the shape of an exterior or peripheral surface of the bulkhead 106 can match the shape of the exterior surface 136 of the top portion 110 of the main body 102, such that the bulkhead 106 can be coupled to a top end of the top portion 110 of the main body 102. In other implementations, the shape of the exterior or peripheral surface of the bulkhead 106 can match the shape of the interior surface 134 of the top portion 110 of the main body 102, such that the bulkhead 106 can be coupled to the interior surface 134 of the top portion 110 of the main body 102 at a top end thereof. In some implementations, the main body 102 and the bulkhead 106 can be formed unitarily, such as in a single molding process, such as in a single metal injection molding process. In other implementations, the bulkhead 106 can be a component of a motor of the thermal immersion circulator 10, such as a bottom portion of a housing of the motor.

The bulkhead 106 can include three holes extending therethrough, for example, one relatively large hole 118 located at a center of the bulkhead 106, and two relatively smaller holes 120 located off-center in the bulkhead 106. The bulkhead 106 can separate the hollow interior 128 of the heater 100 from an exterior of the heater 100 above the heater 100. The peripheral surface of the central hole 118 can be smooth, and the central hole 118 can be configured to allow a rotor or drive shaft 190 (see FIG. 3) to pass from the exterior, through the bulkhead 106, and into the interior 128 of the heater 100, as described further below. Such a drive shaft 190 can be mounted within a bushing or a bearing, such as a roller bearing, which can be mounted within the central hole 118.

The off-center holes 120 can be configured to allow screws 192 (see FIG. 3) or other fasteners (e.g., bolts, nails, etc.) to pass from the exterior, through the bulkhead 106, and into the interior 128 of the heater 100, such as to couple a motor to the top of the heater 100, as described further below. For example, the peripheral surfaces of the holes 120 can be threaded, or a bottom surface (not visible in FIG. 5) of the bulkhead 106 can have a countersink surrounding each of the holes 120 to receive the head of a screw 192 to be screwed through the bulkhead 106 into a motor sitting on top of the heater 100. The holes 118 and 120 can be arranged such that a line extending through the center of each of the holes 118 and 120 is parallel to the left side wall 112 and to the right side wall 114. In some implementations, such as if the motor is coupled to the top of the heater 100 using adhesive, the holes 120 are not used and the bulkhead 106 can include the single hole 118 extending therethrough.

Figure 6:
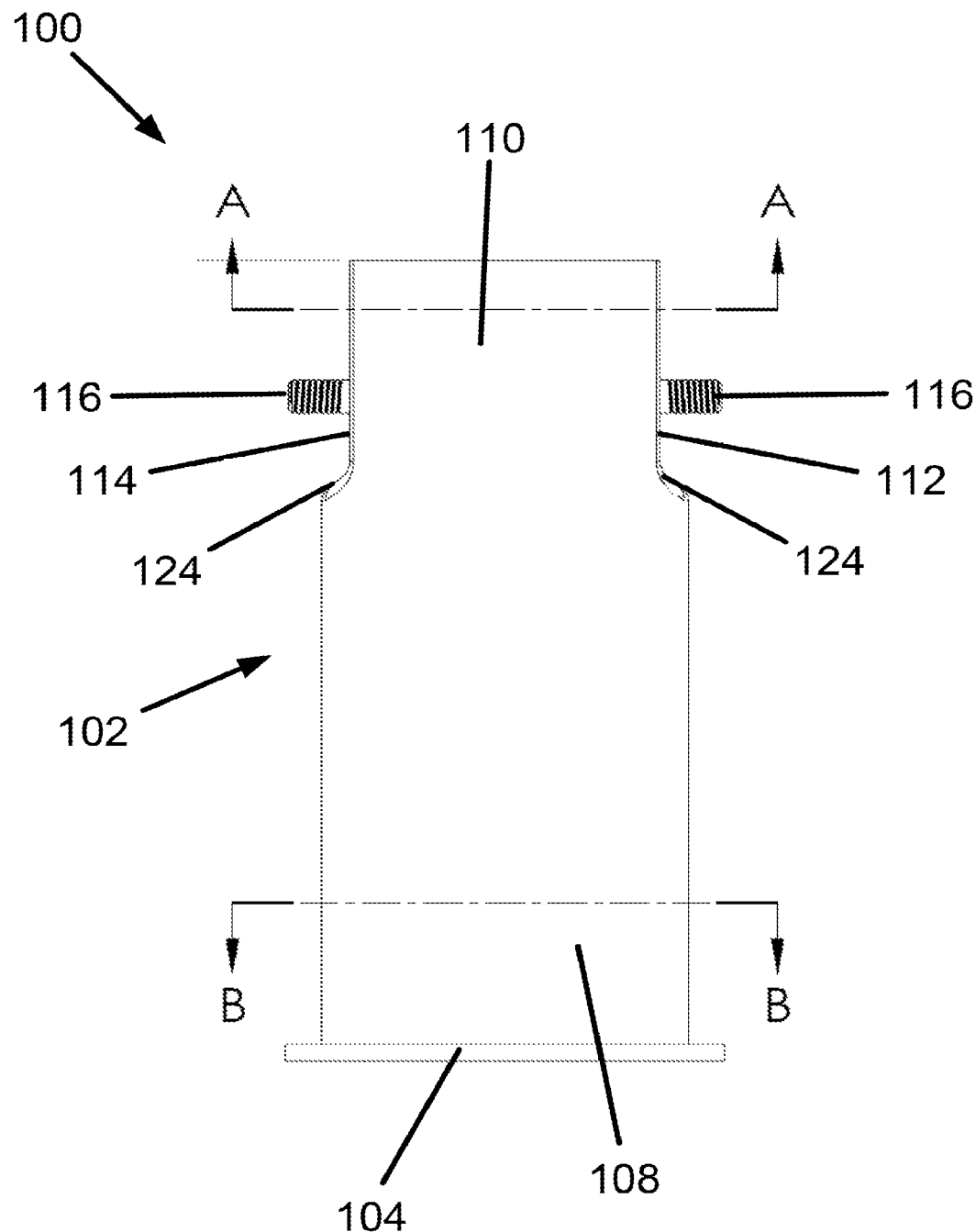
FIG. 6 is a rear view of the heater of FIG. 5, according to at least one illustrated embodiment.
Figure 7:
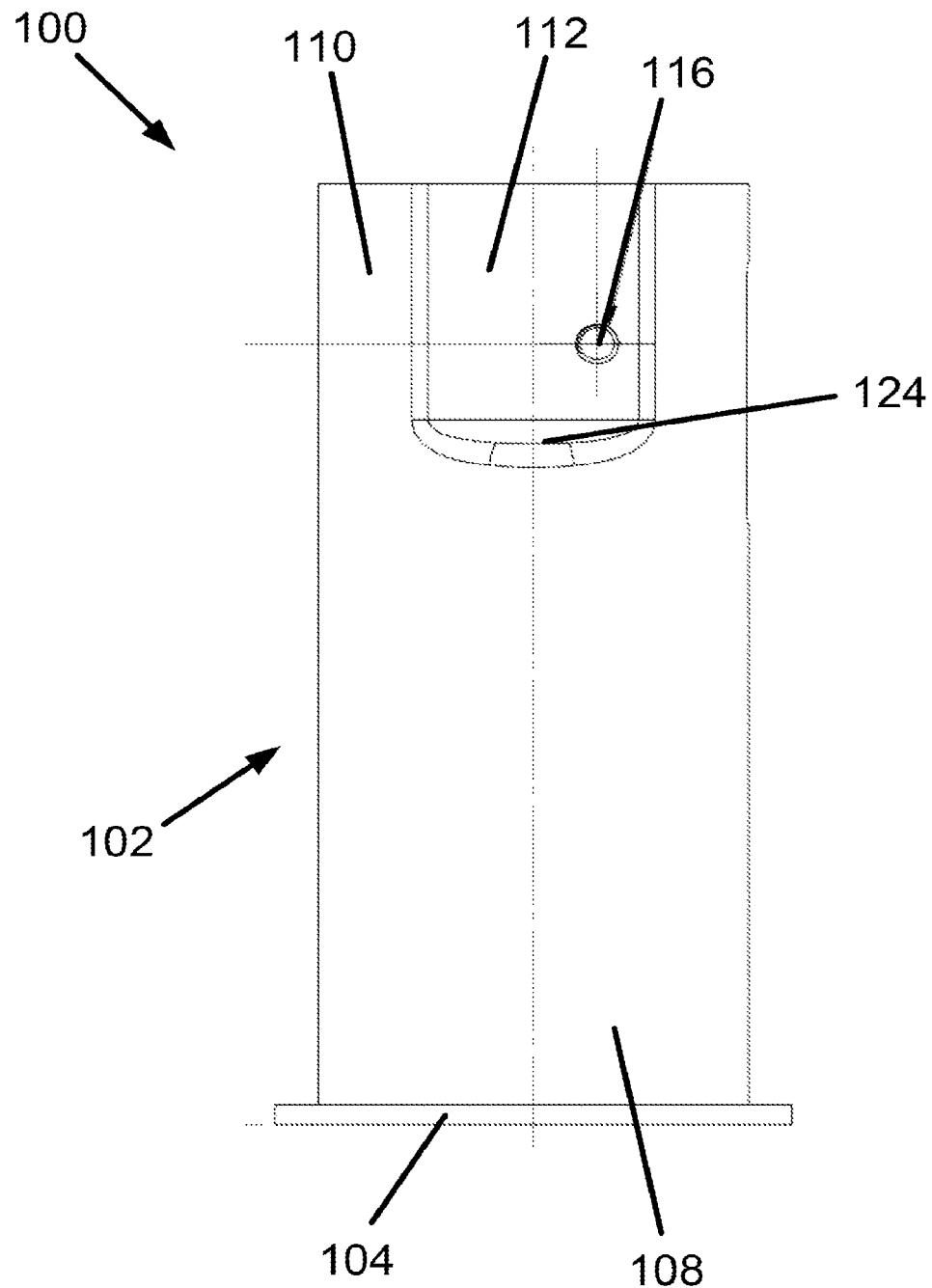
FIG. 7 is a left-side view of the heater of FIG. 5, according to at least one illustrated embodiment.
Figure 8:
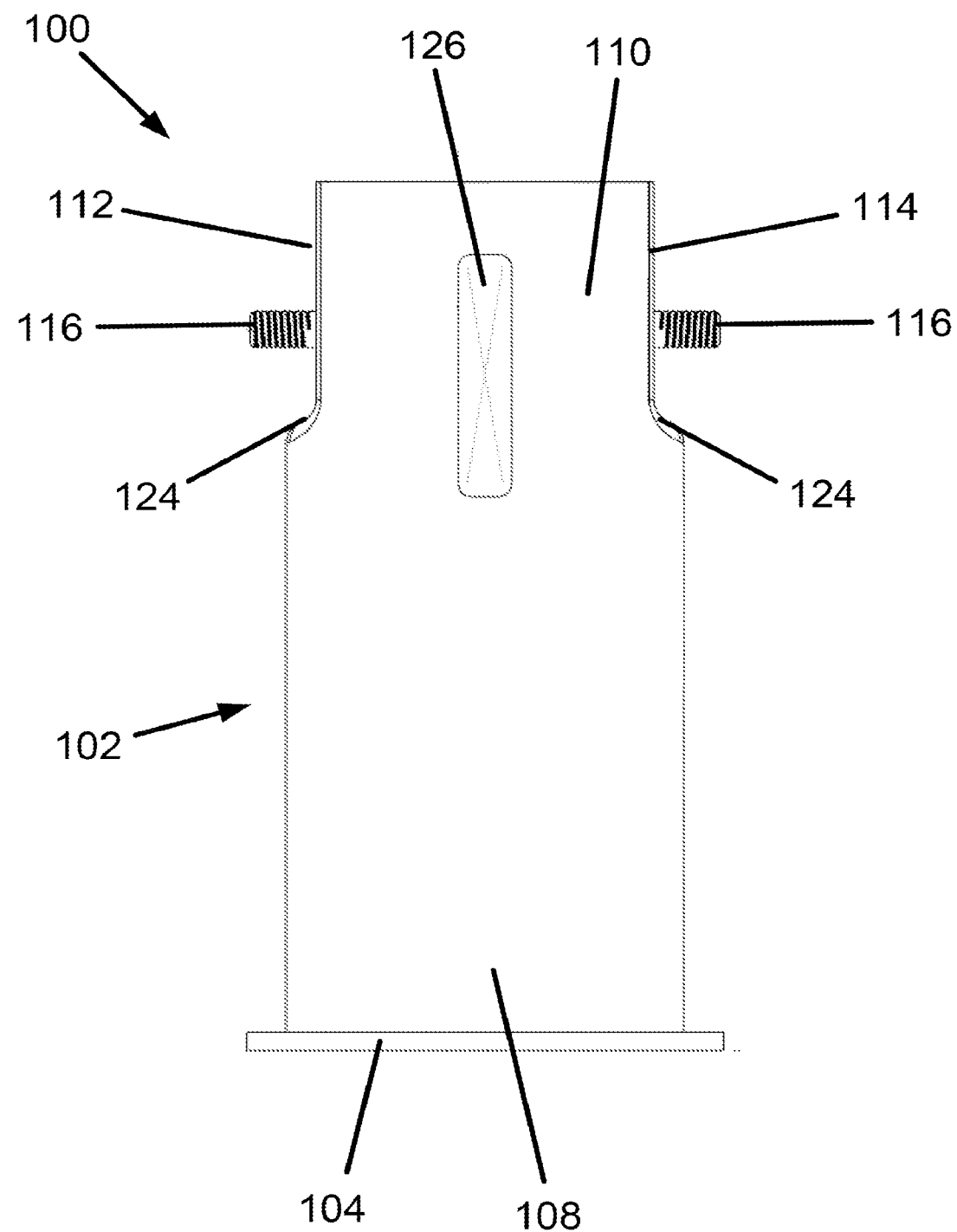
FIG. 8 is a front view of the heater of FIG. 5, according to at least one illustrated embodiment.

FIGS. 6, 7, and 8 are illustrations of rear, left-side, and front views, respectively, of the heater 100. FIG. 6 shows that the transitions 124 between the bottom portion 108 and the left side wall 112 and right side wall 114 of the top portion 110 of the main body 102 are curved. FIG. 7 shows that the threaded studs 116 extend from the left side wall 112 and from the right side wall 114 from positions located within a bottom half of the side wall 112 or 114, and within a front half of the side wall 112 or 114. FIG. 8 shows that an oblong hole or slot 126 extends through a front portion of the tubular side wall of the main body 102, that is, through a curved front portion of the tubular side wall of the cylindrical main body 102.

The slot 126 is positioned at the front portion of the main body 102 such that the slot 126 is spaced equidistantly from the left side wall 112 and the right side wall 114, and such that the centers of the hole 118, the holes 120, and the slot 126 are located on a single plane that is parallel to the left side wall 112 and to the right side wall 114 and about which the main body 102 is symmetrical. The slot 126 has a relatively long vertical axis and a relatively short horizontal axis and thus can be referred to as a vertical slot 126. In alternative embodiments, the slot 126 can have a relatively long horizontal axis and a relatively short vertical axis, and can be referred to as a horizontal or radial slot 126. The vertical slot 126 spans across a portion of the top portion 110 of the main body 102 and across a portion of the bottom portion 108 of the main body 102. The vertical slot 126 extends above and extends below the curved transitions 124 between the bottom portion 108 and the side walls 112, 114 of the top portion 110 of the main body 102. The vertical slot 126 is positioned closer to the top end of the main body 102 than to the bottom end of the main body 102.

A top end of the vertical slot 126 can be co-planar with, or can extend above, the bottom surface of the bulkhead 106 or a top surface of the interior 128 of the main body 102. Thus, any bubbles entering or formed within the interior 128 of the main body 102 can flow out of the interior 128 of the main body 102 and out of the circulator 10, thereby reducing deleterious effects of air or other gaseous build-up in the interior 128 of the main body. In some implementations, the bottom surface of the bulkhead 106 can be sloped upward toward the vertical slot 126, so that bubbles entering or formed within the interior 128 flow naturally toward the vertical slot 126 to exit the circulator 10. In some implementations, the bottom surface of the bulkhead can have a corkscrew shape, so that bubbles entering or formed within the interior 128 flow naturally upward along the corkscrew toward the vertical slot 126 to exit the circulator 10.

When the heater 100 is in use, an opening at the bottom of the main body 102 can be an inlet 17 to the heater 100, the slot 126 can be an outlet of the heater 100, and the interior 128 can be a conduit, passage, or channel in fluid communication with the inlet 17 and the outlet. As described further below, a thick film flexible circuit board 122 can be wrapped around an external surface of the main body 102 between the inlet 17 and the outlet, and thus can be wrapped around the conduit that fluidly couples the inlet 17 to the outlet. The inlet 17 and the outlet can be separated by the flexible circuit board 122 and the flexible circuit board 122 can be positioned to heat fluid passing between the inlet and the outlet. A fluid flow path through the heater 100 can extend from the inlet 17, through the conduit past the flexible circuit board 122, to the outlet. The flexible circuit board 122 can be separated from the fluid passing through the interior 128 of the main body 102 by a distance corresponding to the thickness of the tubular side wall of the main body 102, which can be 0.5 mm, 1.0 mm, 1.5 mm, 2 mm, 2.5 mm, between 0.1 mm and 5 mm, or between 0.5 mm and 2.5 mm.

Figure 9:
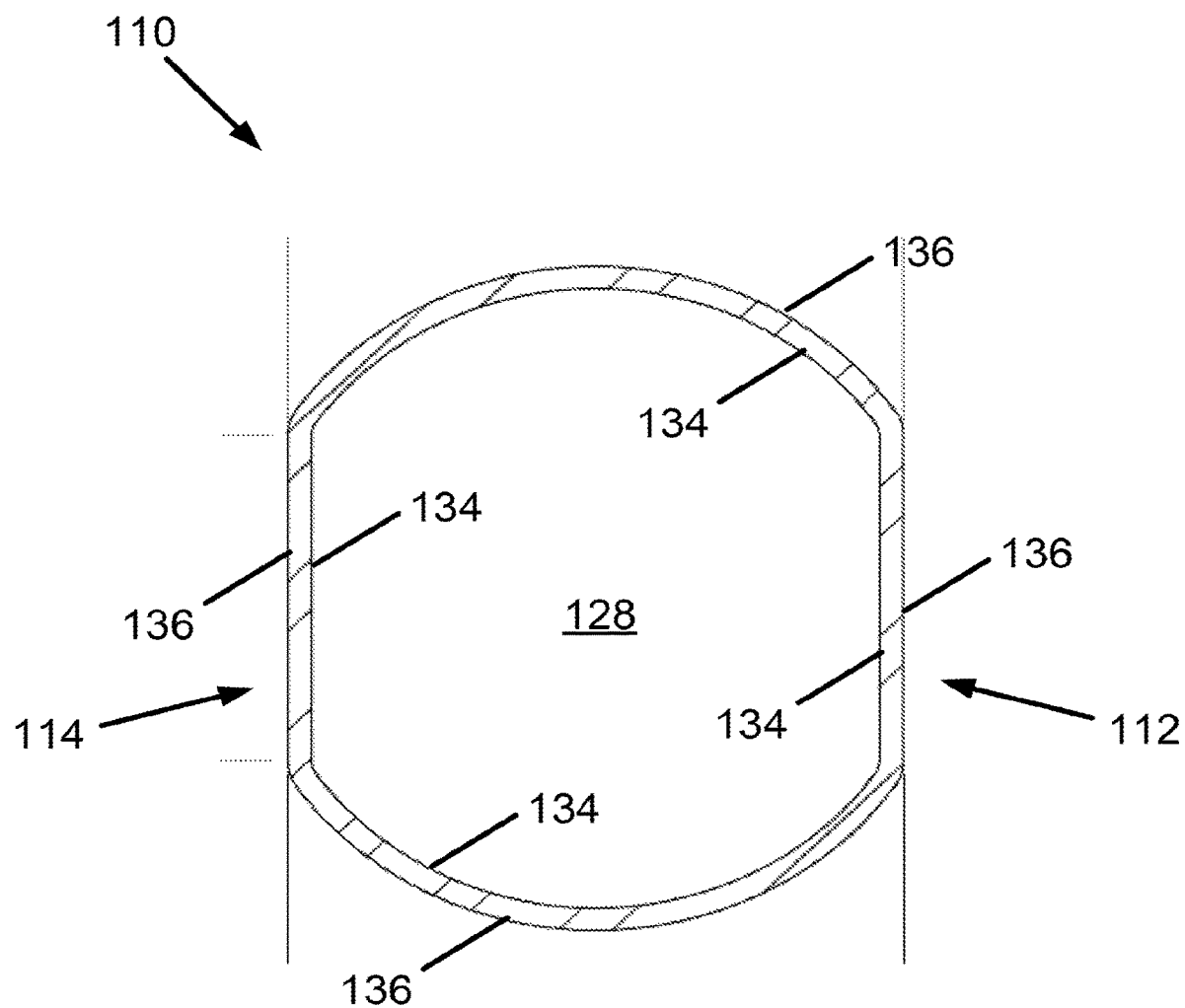
FIG. 9 is a cross-sectional view of the heater of FIG. 5, taken along line A-A in FIG. 6, according to at least one illustrated embodiment.
Figure 10:
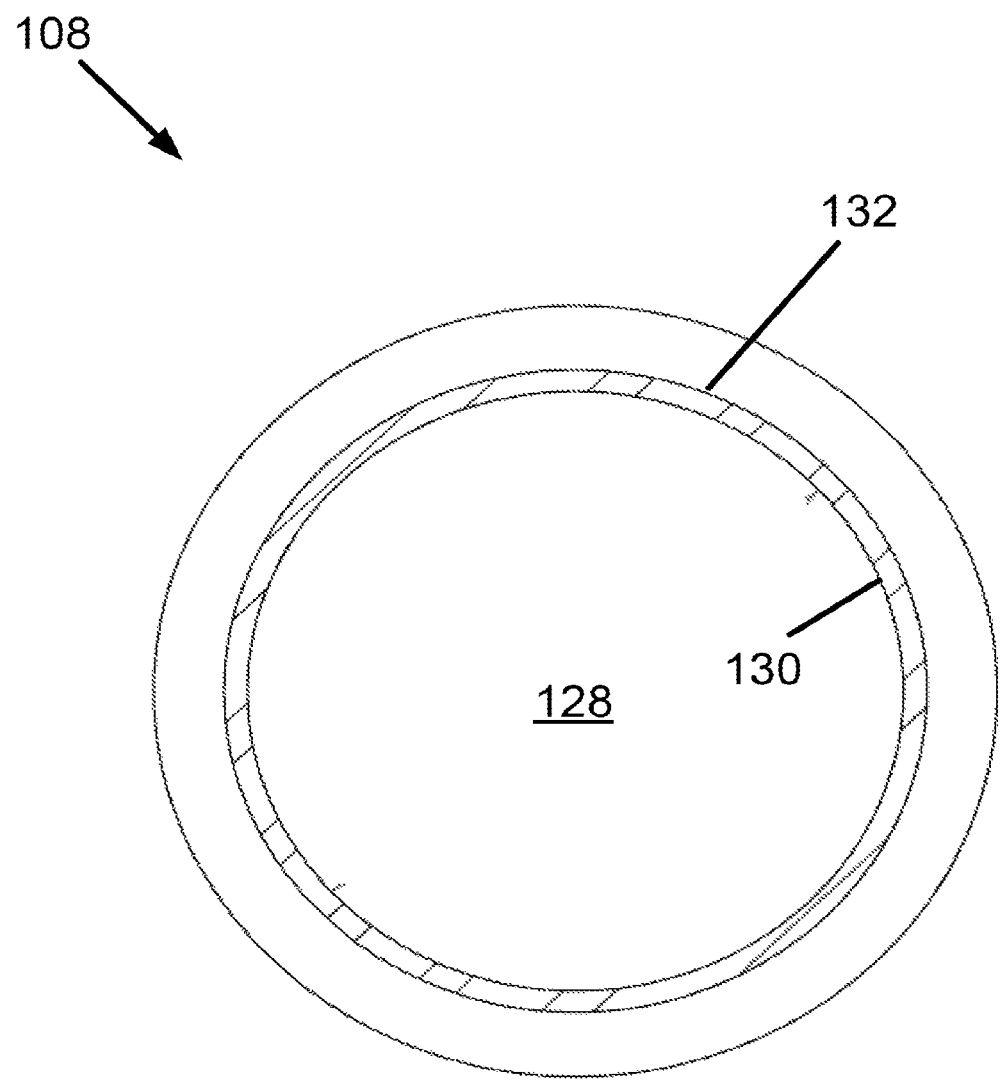
FIG. 10 is a cross-sectional view of the heater of FIG. 5, taken along line B-B in FIG. 6, according to at least one illustrated embodiment.
Figure 11:
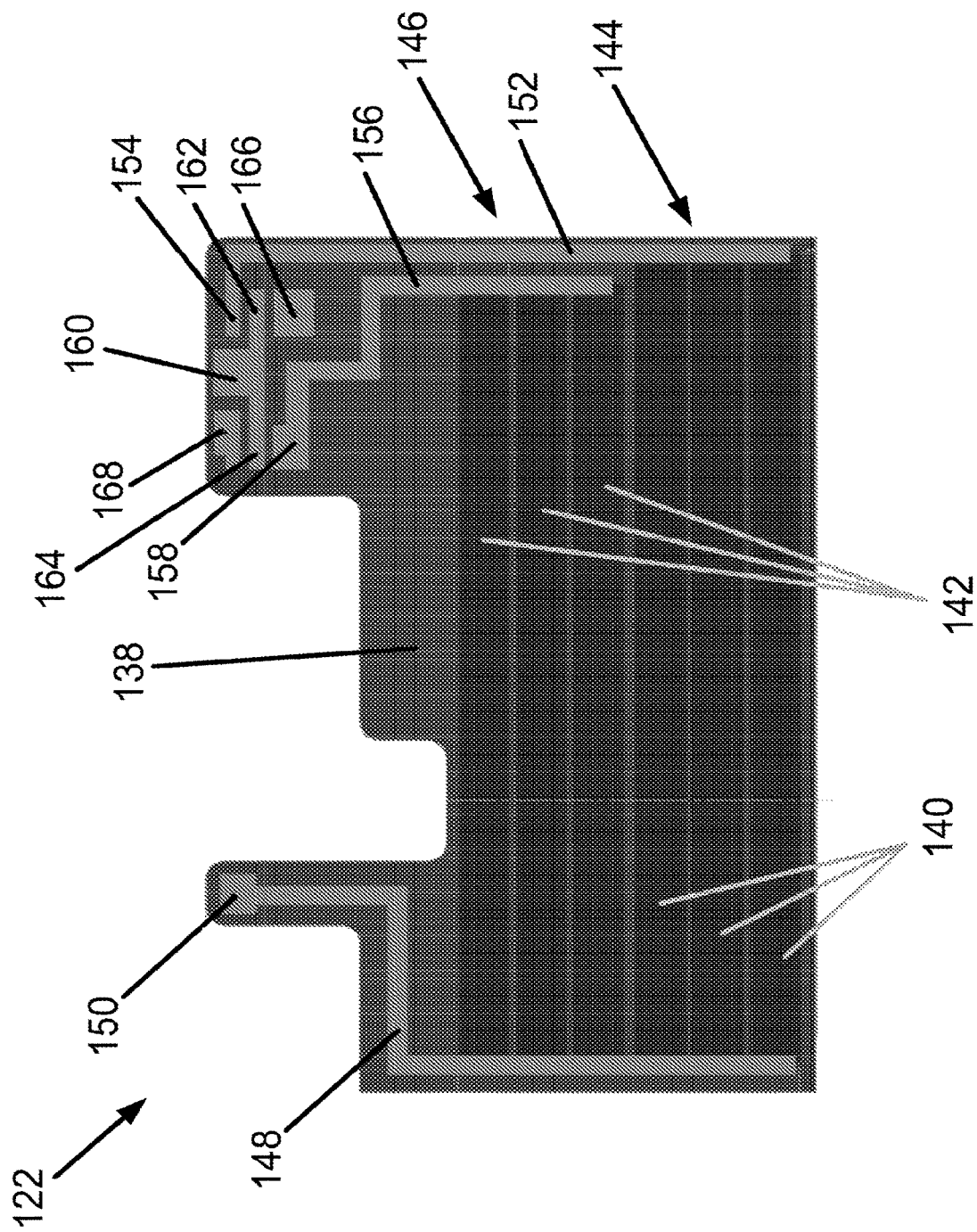
FIG. 11 is a plan view of a flexible circuit board of the heater of FIG. 5, according to at least one illustrated embodiment.

FIGS. 9 and 10 show cross-sectional views of the heater 100, taken along lines A-A and B-B in FIG. 6, respectively. FIG. 11 shows the flexible circuit board 122 in greater detail. As shown in FIG. 11, the flexible circuit board 122 can be a flexible, thick film flexible circuit board 122 including a plurality of thick film layers. For example, the flexible circuit board 122 includes an insulative base layer 138 of electrically insulating material that can electrically isolate the main body 102 of the heater 100 from electrically conductive components (e.g., traces or resistive bands) of the flexible circuit board 122 and any controlling electronics coupled thereto, such that the main body 102 can be made of any suitable electrically conductive or electrically insulating material without interfering with the operation of the flexible circuit board 122.

The flexible circuit board 122 also includes a plurality (three, in the illustrated embodiment) of first resistive bands 140, which together form a first heating element 144 positioned on a bottom end portion of the base layer 138, and a plurality (three, in the illustrated embodiment) of second resistive bands 142, which together form a second heating element 146 positioned above the first heating element 144 on the base layer 138. Each of the first and second resistive bands 140 and 142 can include a thick film band formed on the base layer 138 from any suitable resistive material. For example, the first and second resistive bands 140 and 142 can comprise an FeCrAl alloy, such as the commercially available FeCrAl alloy sold under the brand name Kanthal®. For example, a resistive paste can be laid down on the base layer 138, and a width and a thickness of the paste can be carefully controlled to provide each resistive band 140, 142 with a well-defined resistance. The first and second resistive bands 140 and 142 can extend substantially parallel to one another across the base layer 138.

The flexible circuit board 122 also includes a plurality of conductive pathways formed on the electrically insulating base layer 138. For example, the flexible circuit board 122 includes a neutral pathway 148 that electrically couples a first end of each of the resistive bands 140 and 142 to each other and to a neutral terminal 150. The flexible circuit board 122 also includes a first switched power line 152 that electrically couples a second end of each of the first resistive bands 140 to each other and to a first switched power terminal 154 located near the top of the base layer 138. The flexible circuit board 122 also includes a second switched power line 156 that electrically couples a second end of each of the second resistive bands 142 to each other and to a second switched power terminal 158 located near the top of the base layer 138.

The flexible circuit board 122 also includes an active conductive pathway 160 that extends from a first active terminal 162 adjacent to but electrically separated from the first switched power terminal 154 to a second active terminal 164 adjacent to but electrically separated from the second switched power terminal 158. The active pathway 160, and thus the active terminals 162, 164, can be powered or driven by a 120V or 220V AC power source, for which the neutral pathway 148 and terminal 150 can serve as a return path 148 and a return terminal 150. The flexible circuit board 122 also includes a first gate 166 adjacent to but electrically separated from the first active terminal 162, and a second gate 168 adjacent to but electrically separated from the second active terminal 164. The terminals described herein can be solderable, so as to allow the soldered electrical connection of other electrical components to the flexible circuit board 122.

The first switched power terminal 154 is located above the first active terminal 162, and the first active terminal 162 is located above the first gate 166 on the base layer 138. The second switched power terminal 158 is located below the second active terminal 164, and the second active terminal 164 is located below the second gate 168 on the base layer 138. The reversal of the order of the corresponding first and second components facilitates the connection of controlling electronic components, such as controlling active power switches, e.g., TRIACs, thyristors, power MOSFETs, IGBTs, etc., as further described below. The flexible circuit board 122 also includes a top protective layer that overlays the rest of the electrical components of the flexible circuit board 122 to protect them from water ingress or other potential contaminants.

Figure 12:
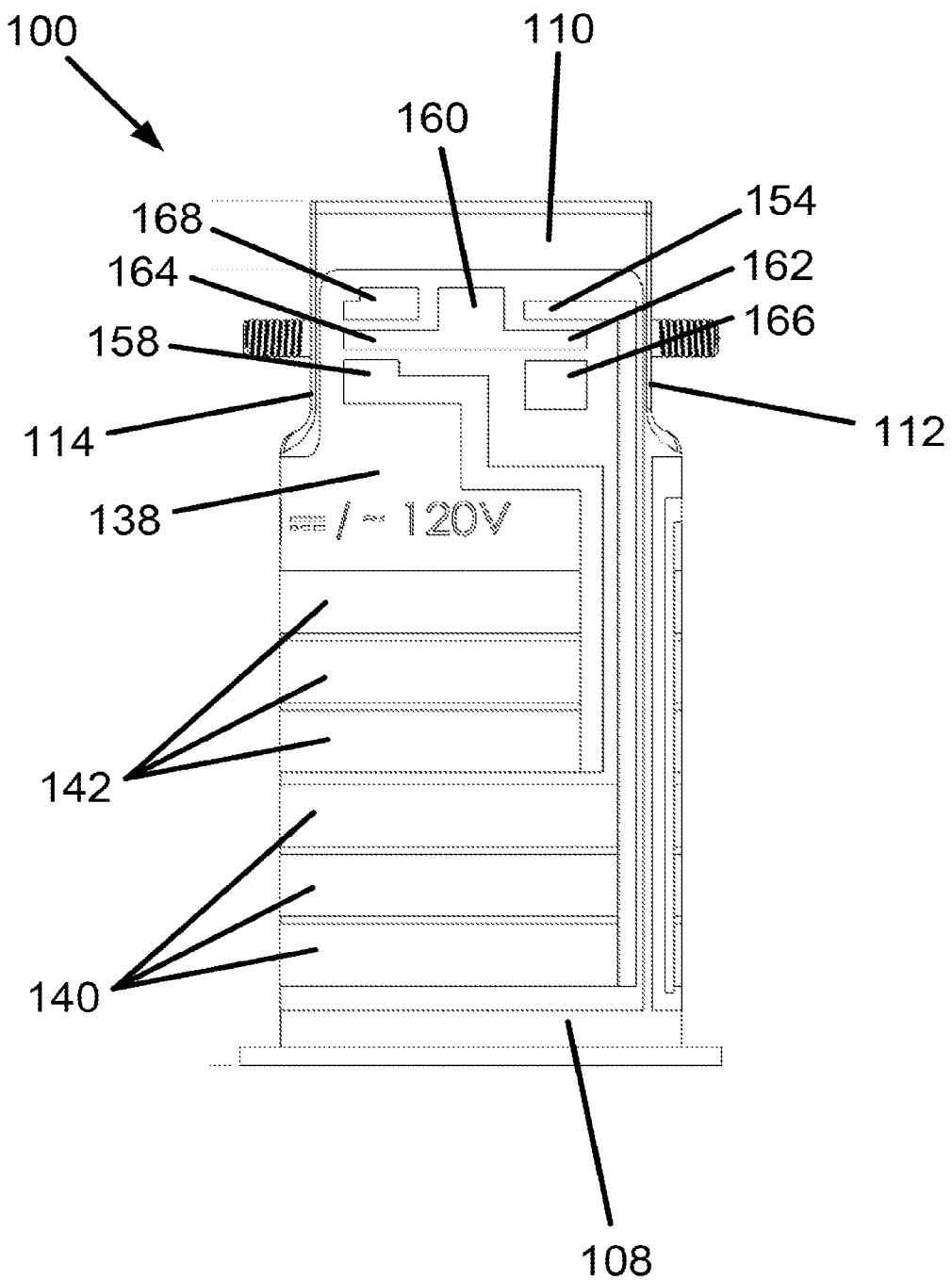
FIG. 12 is a rear view of the heater of FIG. 5, showing the flexible circuit board of FIG. 11, according to at least one illustrated embodiment.
Figure 13:
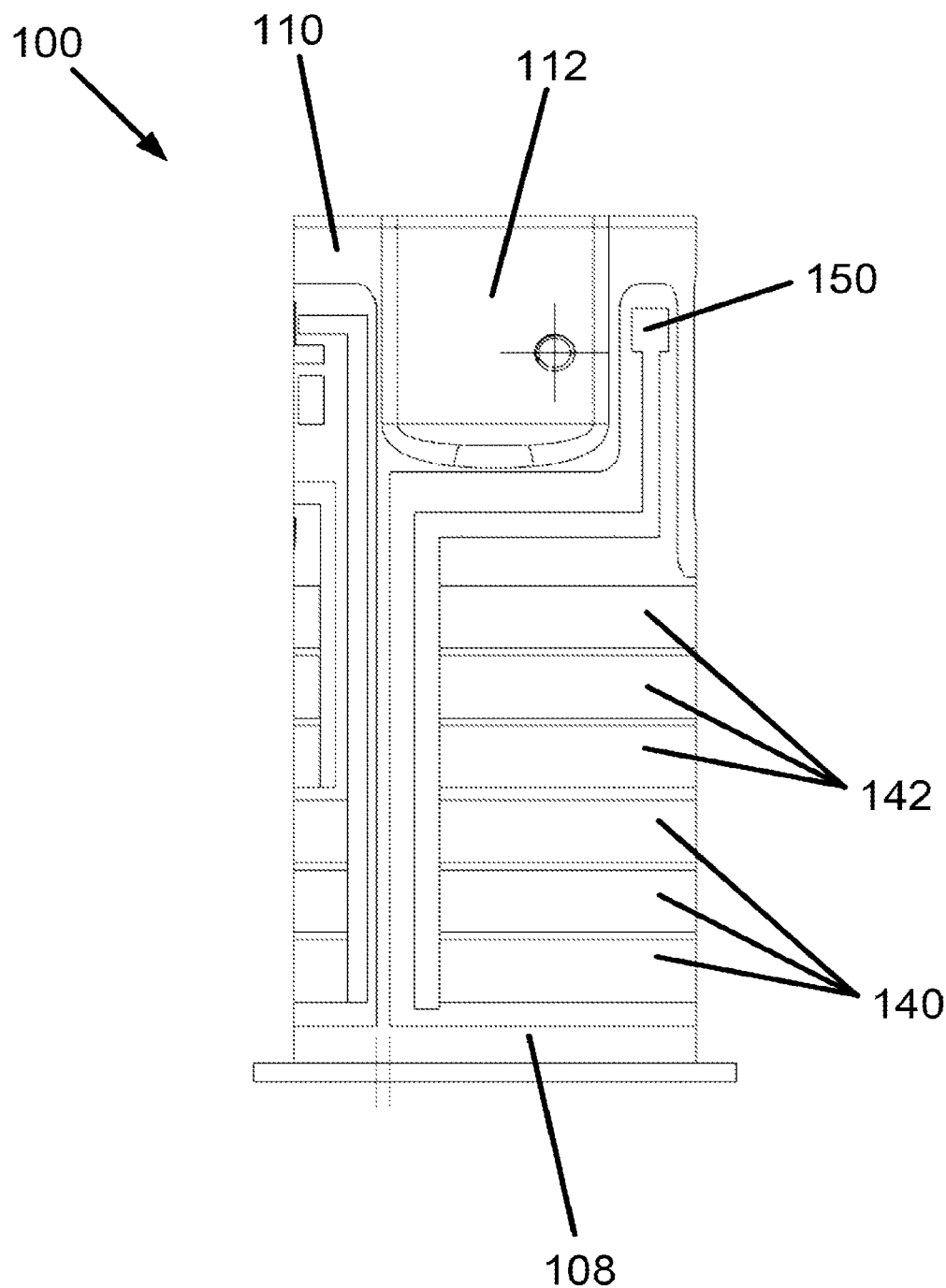
FIG. 13 is a left-side view of the heater of FIG. 5, showing the flexible circuit board of FIG. 11, according to at least one illustrated embodiment.

FIGS. 12 and 13 are rear and left-side views, respectively, of the heater 100 having the flexible circuit board 122 coupled thereto. As shown in FIGS. 12 and 13, the flexible circuit board 122 can be wrapped around the main body 102 of the heater 100 such that a first end of the flexible circuit board 122 is adjacent to a second end of the flexible circuit board 122 and the first ends of the resistive bands 140, 142 are in close proximity to the second ends of the resistive bands 140, 142. That is, the flexible circuit board 122 can wrap all the way around, or substantially all the way around, the main body 102. The flexible circuit board 122 can have a non-zero radius of curvature, such as a radius of curvature between one quarter inch and four inches, or between one half inch and two inches, or a radius of curvature between one inch and one and a half inches.

The first and second resistive bands 140, 142 and thus the first and second heating elements 144, 146, can be located on the bottom portion 108 of the main body 102, and each of the terminals 154, 158, 162, 164, and 168 can be located on the top portion 110 of the main body 102, such as on a curved rear surface of the top portion 110 of the main body 102. The first switched power terminal 154, the first active terminal 162, and the first gate 166 are located adjacent to the left side wall 112 and the second switched power terminal 158, the second active terminal 164, and the second gate 168 are located adjacent to the right side wall 114. The neutral terminal 150 can be located on the top portion 110 of the main body 102, such as on a curved front surface of the top portion 110 of the main body 102 opposite to the rear surface thereof.

Figure 14:
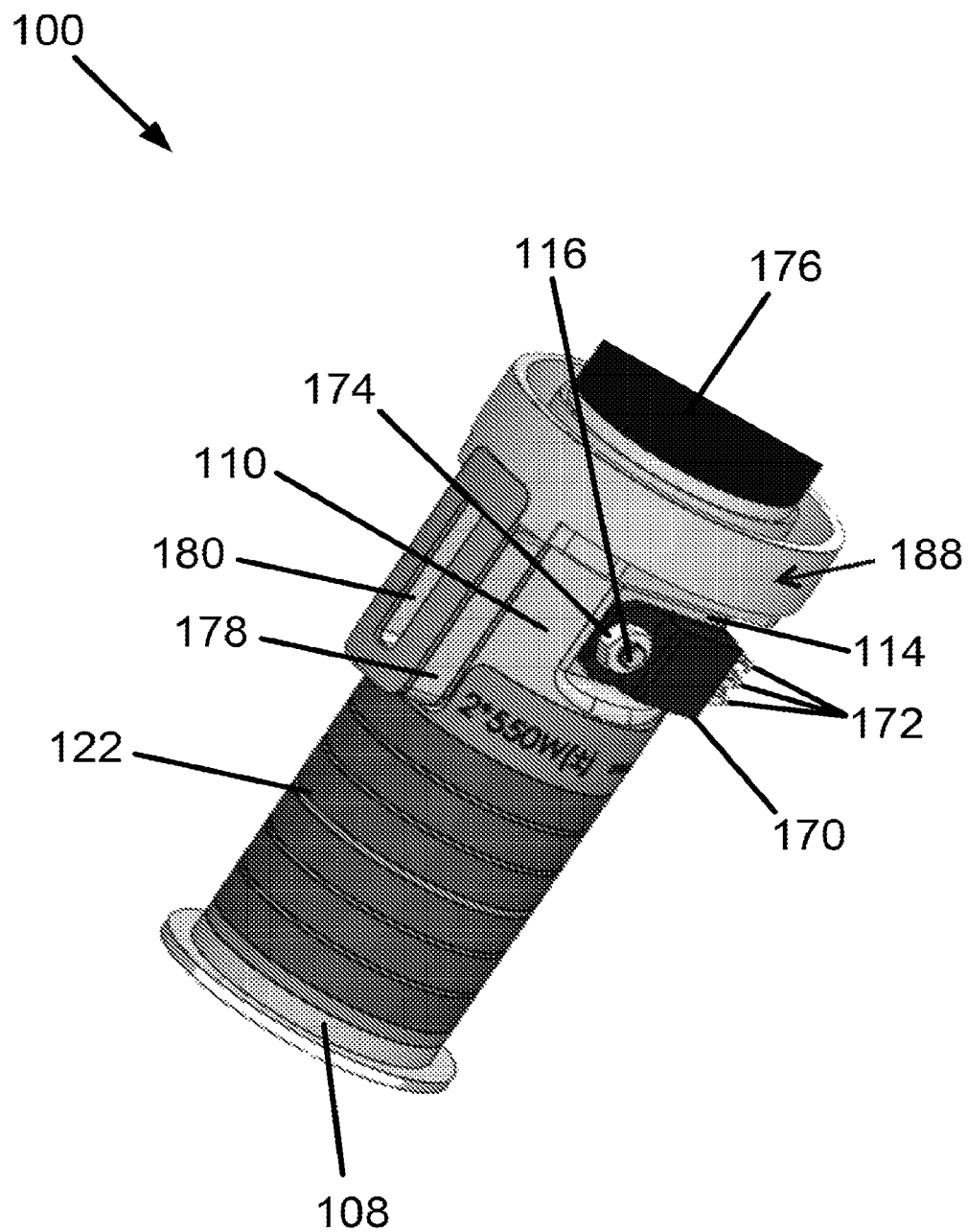
FIG. 14 is a three-dimensional rendering in a perspective view of the heater of FIG. 5, showing other elements coupled thereto, according to at least one illustrated embodiment.

FIG. 14 shows another perspective view of the heater of FIG. 5, with additional components coupled thereto. For example, FIG. 14 shows a first TRIAC 170 coupled to or mounted on the second threaded stud 116 extending radially away from and perpendicular to the right side wall 114. Although the TRIAC 170 is used in the illustrated embodiment, any suitable switch, such as those described above, can be used in alternative embodiments. The truncation of the circular cross-sectional shape of the top portion 110 of the main body 102 by the right side wall 114 provides a relatively flat surface against which the TRIAC 170 can be mounted on the second threaded stud 116. The electrical leads 172 of the TRIAC 170 can be coupled to the second switched power terminal 158, the second active terminal 164, and the second gate 168, such that the TRIAC 170 can control the operation of the second resistive bands 142 and thus the second heating element 146. A nut 174 can be threaded onto the threaded stud 116 over the TRIAC 170 to secure the TRIAC 170 to the right side wall 114 and the main body 102 of the heater 100.

Although not visible in FIG. 14, a second TRIAC can similarly be coupled to or mounted on the first threaded stud 116 and against the left side wall 112, and a second nut can be coupled to the first threaded stud 116 to secure the second TRIAC in place. The electrical leads of the second TRIAC can be coupled to the first switched power terminal 154, the first active terminal 162, and the first gate 166, such that the second TRIAC can control the operation of the first resistive bands 140 and thus the first heating element 144. In alternative embodiments, the TRIACs 170 can be coupled to the main body 102 in any suitable way and at any suitable location, such as by any suitable mechanical fastener (e.g., a screw, bolt, nail, etc.), any suitable adhesive (e.g., a thermally conductive and/or electrically non-conductive adhesive, glue, epoxy, etc.), or by soldering, and such as to the top of the bulkhead 106, to the bottom of the motor 176, or between the bulkhead 106 and the motor 176.

The heater 100 includes two TRIACs, each independently controlling a respective heating element made up of three resistive bands. In alternative embodiments, a heater can include one TRIAC controlling a single heating element, or three, four, five, six, eight, or more TRIACs, each independently controlling a respective heating element. Similarly, in alternative embodiments, a heating element can include a single one, two, four, five, six, eight, or more resistive bands. In such alternative embodiments, the main body 102, such as the top portion 110 of the main body 102, can include a number of flat walls, similar to the flat walls 112 and 114, matching the number of TRIACs.

FIG. 14 also shows that a motor 176 can be mounted to the top of the heater 100, such as to a top surface of the bulkhead 106 using first and second fasteners (e.g., screws 192) extending through the holes 120, as described above, and facilitated by a motor mount 188, which can stabilize the motor 176 with respect to the rest of the heater 100. In alternative embodiments, the motor 176 can be mounted to the top of the heater 100 in any suitable way, such as by any suitable mechanical fastener (e.g., a screw, bolt, nail, etc.) or any suitable adhesive (e.g., a glue, epoxy, etc.), or a friction or interference fit. The motor 176 can comprise a quiet 12V, 24V, or any other suitable voltage DC brushless, DC brush motor, switched reluctance motor, universal motor, or AC inductive motor, and various sealing elements, such as a compression surface gasket, can be used to seal the motor off from the fluid flowing through the heater 100, such as by preventing the fluid from escaping through the holes 118, 120.

FIG. 14 further shows that a spacer 178 having a passageway 180 extending through the spacer 178 can be positioned over the slot 126. The passageway 180 can have a slotted shape matching that of the slot 126, such that the slot 126 and passageway 180 can form a single channel that can carry water or other fluids from within the interior 128 of the heater 100 out of and away from the heater 100 and the electrical components of the heater 100.

Figure 15:
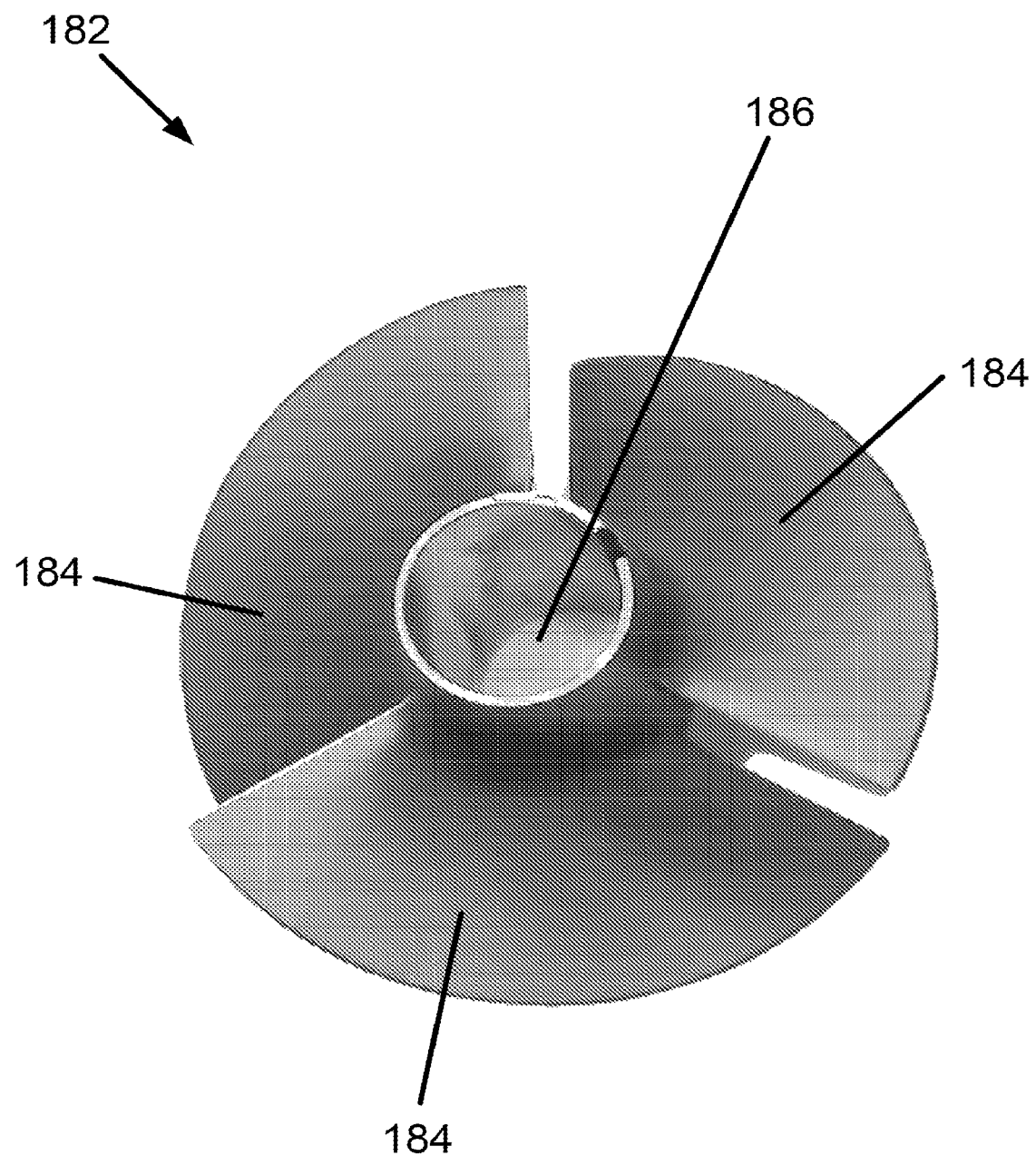
FIG. 15 is a three-dimensional rendering in a perspective view of an impeller for use with the heater of FIG. 5, according to at least one illustrated embodiment.

FIG. 15 shows an impeller 182 that can be installed within the interior 128 of the heater 100. The impeller 182 can be a jet drive impeller. The impeller 182 can, for example, have two, three, or any other suitable number of blades 184 and a central opening 186 sized to receive a shaft 190 extending from the motor 176, through the hole 118 in the bulkhead 106, through the interior 128 of the heater 100, to the impeller 182.

In one alternative implementation, the shaft 190 is not directly physically coupled to the motor 176 and the shaft 190 does not extend through the hole 118 in the bulkhead 106. In such an alternative implementation, a first magnetic element 177 is directly physically coupled to the motor 176, a second magnetic element 179 is directly physically coupled to the shaft 190, and the first and second magnetic elements 177, 179 are magnetically coupled to one another. Thus, the motor 190 can be actuated to directly drive rotation of the first magnetic element 177, which can induce rotation of the second magnetic element 179 via the magnetic coupling, and the rotation of the second magnetic element 179 can induce rotation of the shaft 190 and the impeller 182. In such an alternative implementation, the shaft 190 and the impeller 182 are magnetically coupled to the motor 176. In another alternative implementation, the shaft 190 can be coupled to the motor 176, either physically or magnetically, via a gearbox or other intermediary components.

The shaft 190 can carry torque from the motor 176 to the impeller 182 to drive rotation of the impeller 182 and thus the flow of a fluid such as water through the interior 128 of the heater 100. The impeller 182 can be mounted at or near the bottom of the main body 102 of the heater 100, or closer to the bottom end of the main body 102 than to the slot 126, such that the heater 100 can be used in bodies of fluid having low fluid levels, as further described below.

The heater 100 can be incorporated into a thermal immersion circulator for use in various applications. In use, the motor 176 can be turned on to drive the impeller 182, and can be used to control a rate of rotation of the impeller 182 to control the flow rate of a fluid such as water through the heater 100. In some implementations, and in particular when the heater 100 is being used to heat a fluid, the motor 176 can be used to drive the impeller 182 to rotate in a first direction, to cause fluid to flow upward, i.e., in through the opening at the center of the annular flange 104 at the bottom of the heater 100, through the interior 128 of the main body 102 of the heater 100, out of the main body 102 through the slot 126 in the tubular side wall of the main body 102, through the passageway 180 of the spacer 178, and out of the housing 16 through the opening 18 in the side wall of housing 16. In such an implementation, the opening at the center of the annular flange 104 and at the bottom end of the main body 102 is an inlet to the heater 100, the slot 126 is an outlet to the heater 100, the opening 18 is an outlet to the housing 16, and the inlet can be larger than the outlets.

By mounting the heater 100 in a thermal immersion circulator and positioning the thermal immersion circulator in a fluid so that the bottom of the heater 100 is exposed to the fluid, the fluid (e.g., water) is allowed to be pulled into the heater 100 by the impeller 182 from the very bottom of the heater 100. Further, the motor 176 can drive the impeller 182 to rotate fast enough to draw water up through the interior 128 of the main body 102 even when the water within the main body 102 is exposed to atmospheric air, such as when the heater 100 is used to heat water having a very low water level (e.g., a water level below the bottom of the slot 126. As an example, a thermal immersion circulator including the heater 100 can be used to heat a fluid having a depth of less than 1.5 inches.

A fluid at a higher temperature rises above the same fluid at a lower temperature, so drawing the fluid into the heater 100 from the very bottom of the heater 100 allows relatively cool fluid to be drawn into the heater, allowing more effective and efficient heating of the fluid. Further, drawing water in at the bottom of the heater 100 and upward through the main body 102 helps to purge any air bubbles within the heater 100, and can help to reduce the level of noise generated by a thermal immersion circulator including the heater 100, such as by reducing cavitation within the heater 100. Further still, positioning the outlet for the fluid flow in the side of the main body 102 rather than at the top end of the main body 102, and in the side of the housing 16, allows a thermal immersion circulator including the heater 100 to be more compact, as the motor 176 and other electric components of the thermal immersion circulator (e.g., a power source such as a battery or an electric cord for plugging into a wall outlet) can be mounted on top of the heater 100 within the housing 16.

In other implementations, the motor 176 can be used to drive the impeller 182 to rotate in a second direction opposite to the first direction, to cause fluid to flow downward, i.e., in through the slot 126, through the interior 128 of the main body 102 of the heater 100, and out through the opening at the center of the annular flange 104 at the bottom of the heater 100. In such an implementation, the opening at the center of the annular flange 104 and at the bottom end of the main body 102 is an outlet to the heater 100, the slot 126 is an inlet to the heater 100, the opening 18 is an inlet to the housing 16, and the outlet can be larger than the inlets.

When the heater 100 is in use, a significant current can pass through the controlling electronics (e.g., the TRIACs) and the other electrical components of the flexible circuit board 122. For example, using a 120V AC, 60 Hz power supply, each of the heating elements 144, 146 can draw 550±50 W of power. The heater 100 can draw 1100±100 W of power total. Such a large power draw can heat the controlling electronics (e.g., the TRIACs), in some cases, to undesirably high temperatures.

In the heater 100, the controlling electronics (e.g., the TRIACs or any suitable electronic switch either enclosed within an encapsulant or an encapsulating package, or not encapsulated and built integrally with the main body 102) are mounted in direct contact with a flat surface of the main body 102, which can comprise a highly heat-conductive material such as steel, and which is in direct contact with the flexible circuit board 122. That is, the controlling electronics (e.g., the TRIACs) and the flexible circuit board 122 can be in direct contact with a common heat conductive surface. The term "direct contact," in this context, includes contact through one or more substrate layers, such as an adhesive layer, a fill pad, a thermally conductive film, or a grease. A fluid (e.g., water) drawn through the heater 100 can act as a coolant for the controlling electronics (e.g., the TRIACs) to draw heat conducted from the controlling electronics through the main body 102 away from the controlling electronics. Thus, the controlling electronics (e.g., the TRIACs) can be water-cooled. Substantially all of the heat generated by the TRIACs can be transferred into the fluid being heated, such that a temperature of the TRIACs can be substantially the same as the temperature of the fluid being heated. This heat exchange pathway simultaneously transfers heat away from components that benefit from cooling, and into the fluid that is to be heated. Thus, the heating elements 144 and 146, as well as the controlling electronics, can be thermally coupled or thermally conductively coupled to the fluid passing through the main body 102.

In some embodiments, the interior surfaces 130 and 134 of the heater 100 can be textured or texturized so that the surfaces 130 and 134 retain some of the fluid being heated (e.g., some of the fluid can cling to the textured surfaces 130 and 134 by surface tension) when the thermal immersion circulator 10 and the heater 100 are removed from the body of the fluid being heated. For example, the surfaces 130 and 134 can be texturized so they are hydrophilic. The surfaces 130 and 134 can also be coated with a hydrophilic coating to improve the retention of a fluid such as water by the surfaces 130 and 134 when the heater 100 is removed from the body of the fluid. Water or any other fluid retained on the surfaces 130 and 134 can provide a heat reservoir to protect the thermal immersion circulator 10 and the heater 100 from transient thermal effects arising from the removal of the circulator 10 and heater 100 from the body of the fluid being heated, such as by removing heat from the heater 100 through latent heat of vaporization of the fluid.

In some embodiments, the heater 100 includes one or more temperature responsive transducers, e.g., thermistors, thermocouples, resistance temperature detectors (RTD), etc. As one specific example, the heater 100 can include three thermistors: a first thermistor near the bottom of the main body 102, such as on the flange 104 or on the housing 116, a second thermistor near the slot 126, such as on the main body 102 adjacent the slot 126 or on the housing 116, and a third thermistor at the flexible circuit board 122, such as on the first or second heating element 144 or 146.

The first and second thermistors, at the openings to the interior 128 of the heater 100, can provide information regarding the temperature of the fluid being heated to facilitate more precise control of the heater 100. The first and second thermistors can measure temperatures of a fluid being heated when the heating elements 144, 146 are switched off, to reduce interference in the measurements of the temperature of the fluid caused by the operation of the heating elements 144, 146. The third thermistor can provide information regarding the temperature of the heating elements 144 and 146 to facilitate the prevention of their overheating.

A thermal immersion circulator including the heater 100 can include control circuitry or a computer that can direct the operation of the flexible circuit board 122, such as through the TRIACs. As one example, the control circuitry or computer can accept a desired or target temperature of a fluid to be heated, such as a temperature designated by a user of the thermal immersion circulator. The control circuitry or computer can direct the TRIACs to switch both the first heating element 144 and the second heating element 146 on, and can direct the motor 176 to turn the impeller 182. The heating elements 144 and 146 can generate heat that is conducted through the main body 102 to the fluid being heated within the interior 128 of the main body 102. Once the temperature of the fluid being heated, as measured by the first thermistor or the second thermistor, reaches the target temperature, the control circuitry or the computer can direct the TRIACs to switch the heating elements 144, 146 off.

To maintain the fluid at the target temperature, the control circuitry or the computer can direct the TRIACs to intermittently switch on one of the heating elements 144, 146. In some implementations, the control circuitry or the computer can direct the TRIAC 170 to switch the second heating element 146 on and off at pre-determined time intervals. In other implementations, the control circuitry or the computer can direct the TRIAC 170 to switch the second heating element 146 on when the temperature of the fluid being heated, as measured by the first thermistor or the second thermistor, falls below the target temperature by a pre-determined amount, and off when the temperature of the fluid being heated, as measured by the first thermistor or the second thermistor, rises above the target temperature by a pre-determined amount.

As another example, if the temperature of one of the heating elements 144, 146, as measured by the third thermistor, exceeds a threshold temperature, such as a temperature at which the flexible circuit board 122 might suffer damage, then the control circuitry or computer can direct the TRIACs to switch the heating elements 144, 146 off.

In some embodiments, the thermal immersion circulator 10 can include an accelerometer, which can be coupled to the control circuitry or the computer. When a signal from the accelerometer crosses a predetermined threshold value, the control circuitry or the computer can direct the TRIACs to switch off the heating elements 144 and 146, and the control circuitry or the computer can shut off the motor 176 and the impeller 182. In such embodiments, the thermal immersion circulator 10 can be automatically shut down when the thermal immersion circulator 10 is knocked over in a pot or picked up by an operator.

Figure 16:
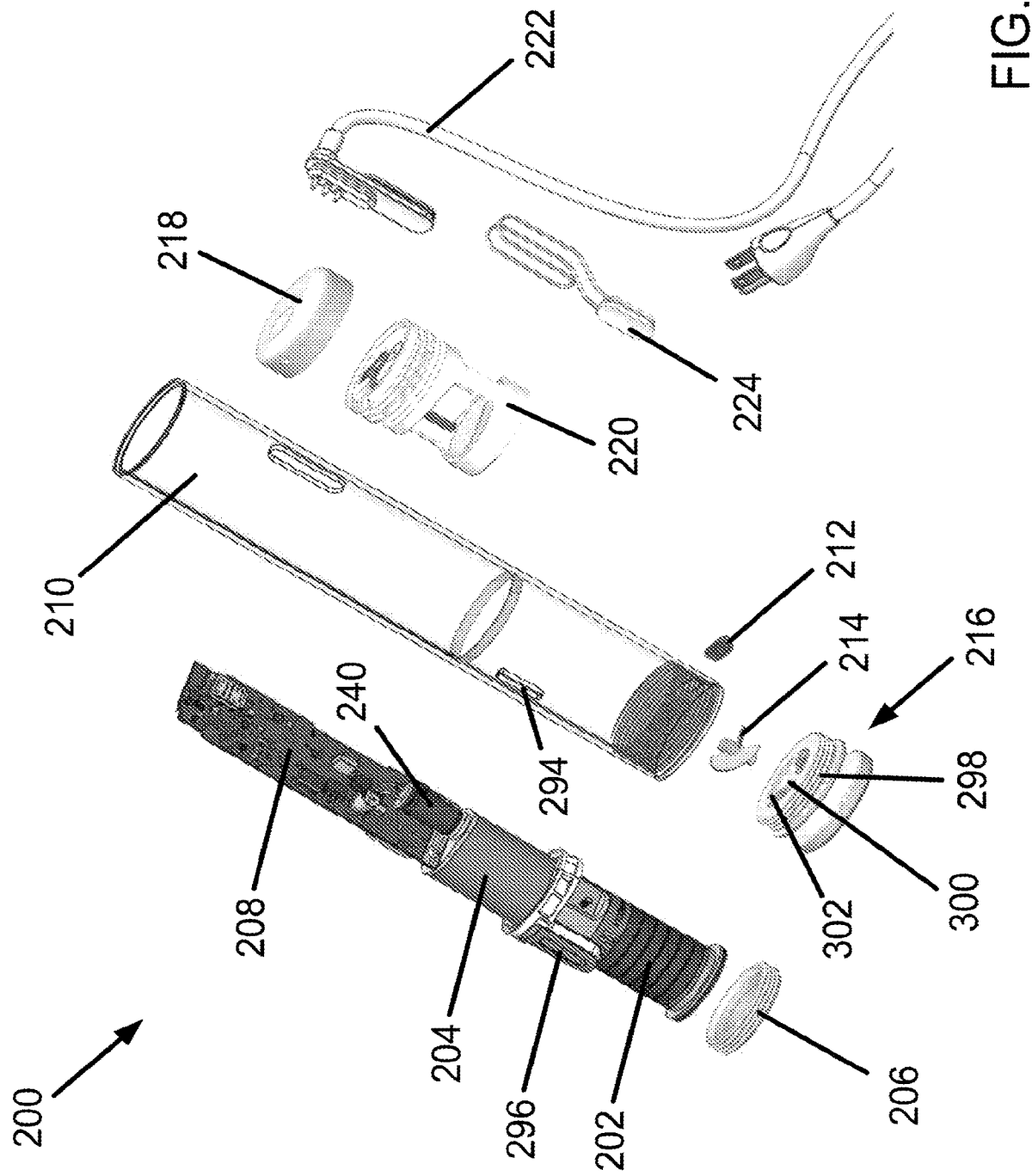
FIG. 16 is an exploded view of another thermal immersion circulator, according to at least one illustrated embodiment.

FIG. 16 shows the components of another embodiment of a thermal immersion circulator 200 in an exploded view. The thermal immersion circulator 200 can have components similar or identical to corresponding components of the thermal immersion circulator 10, with some differences discussed herein. The thermal immersion circulator 200 includes a heater 202 similar to the heater 100, a motor 204 similar to motor 176, a coupling nut 206 similar to coupling nut 40, and a printed circuit board including electronic components 208. The thermal immersion circulator 200 can also include a housing 210 similar to housing 16, a housing bumper 212, an impeller 214 similar to impeller 182, and an inlet 216 similar to inlet 14. The thermal immersion circulator 200 can also include a top cap assembly 218 similar to top cap assembly 28, a support basket 220 for supporting the printed circuit board and electronics 208 within the housing 210, a power cord 222 similar to the power cord 32, and a clip 224 similar to the clip 30.

A method of assembling the thermal immersion circulator 200 can include, possibly, but not necessarily in the following order: inserting the heater 202, motor 204, and printed circuit board and electronics 208 into the housing 210, and securing the heater 202, motor 204, and printed circuit board and electronics 208 to the housing 210 using the coupling nut 206, as described in greater detail below with reference to FIG. 21. The method can further include inserting the support basket 220 into the housing 210 so that the support basket 220 is snugly engaged by the housing 210 and snugly engages the printed circuit board and electronics 208. The method can further include coupling the power cord 222 to the housing 210 and the printed circuit board and electronics 208 through the housing 210. The method can further include coupling or joining the components inserted into the housing 210 to the housing 210 in a waterproof fashion, such as by ultrasonically welding, applying sealants or adhesives, or the use of mechanical seals. The method can further include coupling the top cap assembly 218 to the top ends of the support basket 220 and the housing 210. The method can further include coupling the propeller 214 to a drive shaft 232 (see FIG. 17) coupled to the motor 204 and inserting the housing bumper 212, described in greater detail below with respect to FIG. 21, into a slot in the housing 210. The method can further include coupling the inlet 216 to the bottom end of the housing 210. The method can further include attaching the clip 224 to the power cable 222.

Figure 17:
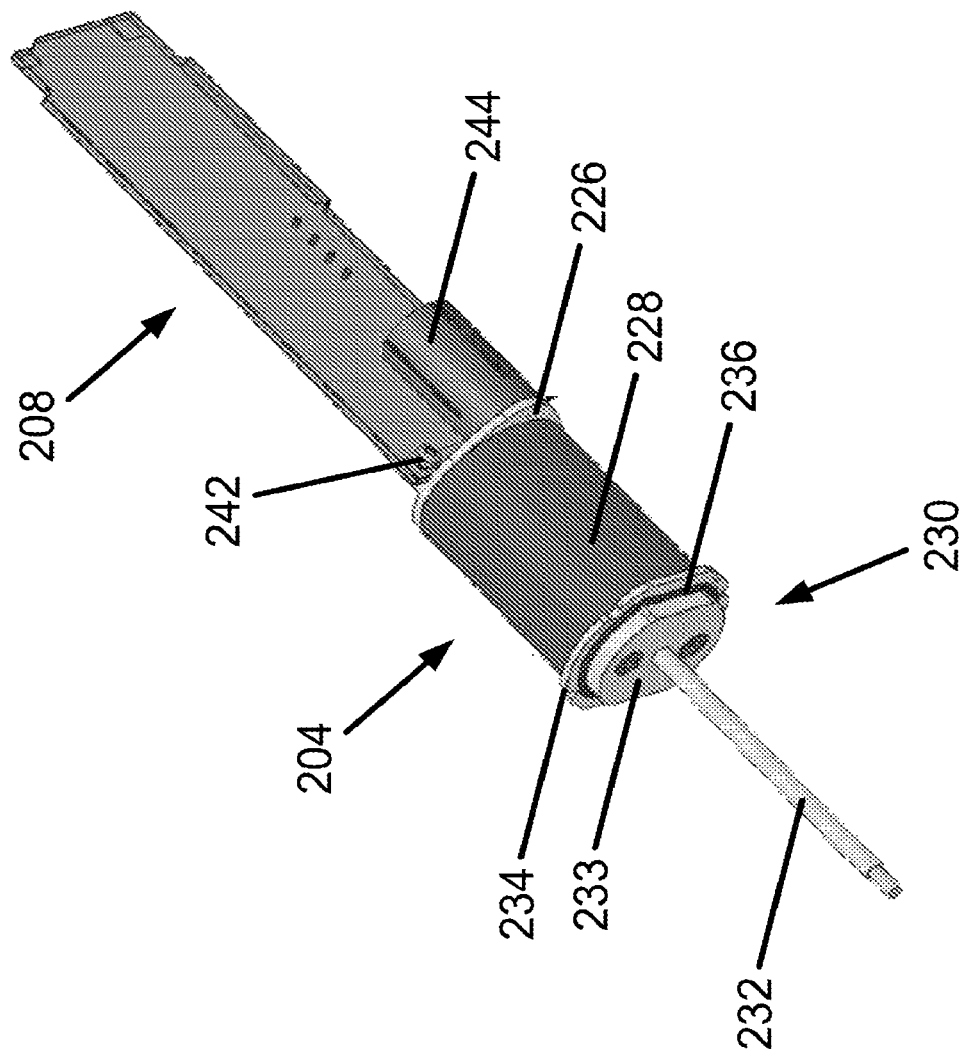
FIG. 17 is a three-dimensional rendering in a perspective view of a motor and electronics of the thermal immersion circulator of FIG. 16, according to at least one illustrated embodiment.
Figure 18:
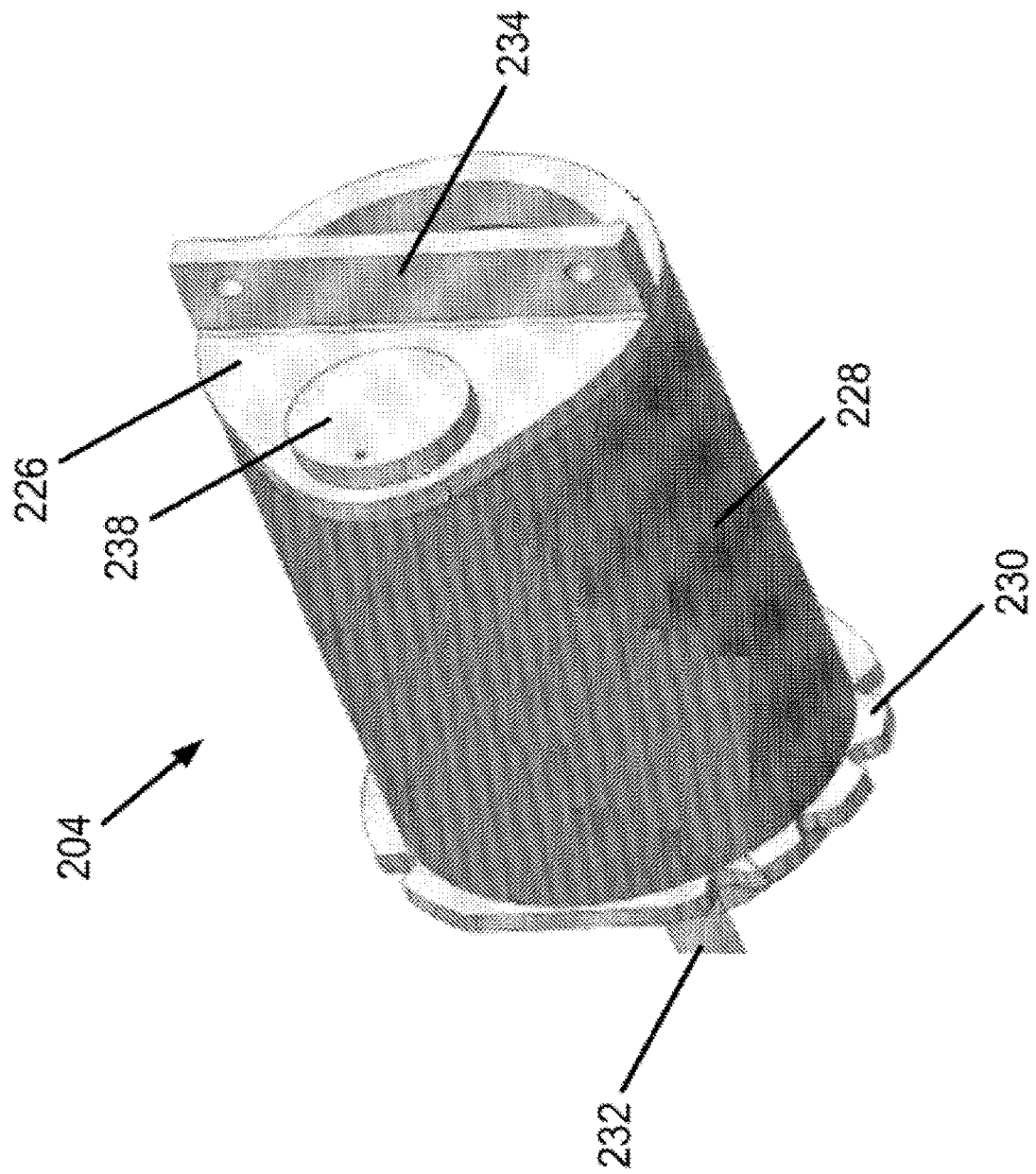
FIG. 18 is a three-dimensional rendering in a perspective view of the motor of the thermal immersion circulator of FIG. 16, according to at least one illustrated embodiment.

FIGS. 17 and 18 illustrate additional details of the motor 204 and the printed circuit board and electronics 208. For example, the motor 204 can have a housing including a top plate 226, an outer cylindrical shell 228, and a bottom plate 230. Mechanical or electrical components of the motor 204 can be housed within the shell 228 between the top plate 226 and the bottom plate 230, and can be used to turn a drive shaft 232, having a diameter of about 4 mm, such as at rates of at least 1800 rpm, with 2600 rpm being a suitable example. As shown in FIG. 18, the top plate 226 can include a vertically extending ridge or tab 234 extending across and protruding vertically away from the top surface of the top plate 226. The ridge 234 can include two openings 236 that can accommodate screws or other fasteners 242 to couple the printed circuit board and electronics 208 to the ridge 234. The top plate 226 can also include a raised cylindrical pedestal 238 to which a capacitor or other energy storage device 240 (see FIG. 16) can be mounted.

The bottom plate 230 can include a boss 233 extending vertically away from a peripheral flange 234, and a seal 236 positioned to extend around the boss 233 where the boss 233 meets the flange 234. The boss 233 can have a cross sectional shape matching the cross sectional shape of the interior 128 of the top portion 110 of the main body 102, so that the boss 233 can snugly mate with the top portion 110 of the main body 102 while the flange 234 engages the top of the main body 102 and the seal 236 seals the interior 128 of the main body 102 from an exterior thereof. In such an implementation, the bottom plate 230 can form the bulkhead 106 of the heater 100.

The printed circuit board and electronics 208 can be coupled to the ridge 234 of the top plate 226, such as with screws 242, the capacitor 240 can be coupled to the pedestal 238, and a heat sink 244 (see FIG. 17) can be coupled to the pedestal 238 and capacitor 240, so that heat generated by the capacitor 240 can be transferred to the heat sink 244 and thereby to the top plate 226. In one alternative implementation, the circulator 200 does not include the heat sink 244 and heat generated by the capacitor 240 can be transferred directly to the top plate 226. The motor housing can provide a heat path to transfer heat from above the motor 204 to below the motor 204. For example, heat from the printed circuit board and electronics 208 can flow through the ridge 234, through the top plate 226, through the outer shell 228, through the bottom plate 230, and into the fluid flowing through a heater coupled to the bottom plate 230. Similarly, heat from the capacitor can flow through the heat sink 244, through the pedestal 238, through the top plate 226, through the outer shell 228, through the bottom plate 230, and into the fluid flowing through the heater coupled to the bottom plate 230.

These flow paths can dissipate heat from the electronic components of the circulator 200 such that a temperature of the heat sink 244 rises no more than 4° Celsius over the temperature of the fluid flowing through the heater coupled to the bottom plate 230, or such that a temperature of the electronic components, such as of a controlling active power switch, as described above, does not rise above 105° Celsius or above 120° Celsius. To provide efficient flow paths, the top plate 226 and the bottom plate 230 can comprise heat conductive materials such as zinc, copper, or aluminum, and the outer shell 228 can comprise heat conductive materials such as zinc, copper, or aluminum. As two specific examples, the outer shell 228 can include a 1.65 mm thick copper shell or a 3.00 mm think aluminum shell.

Figure 19:
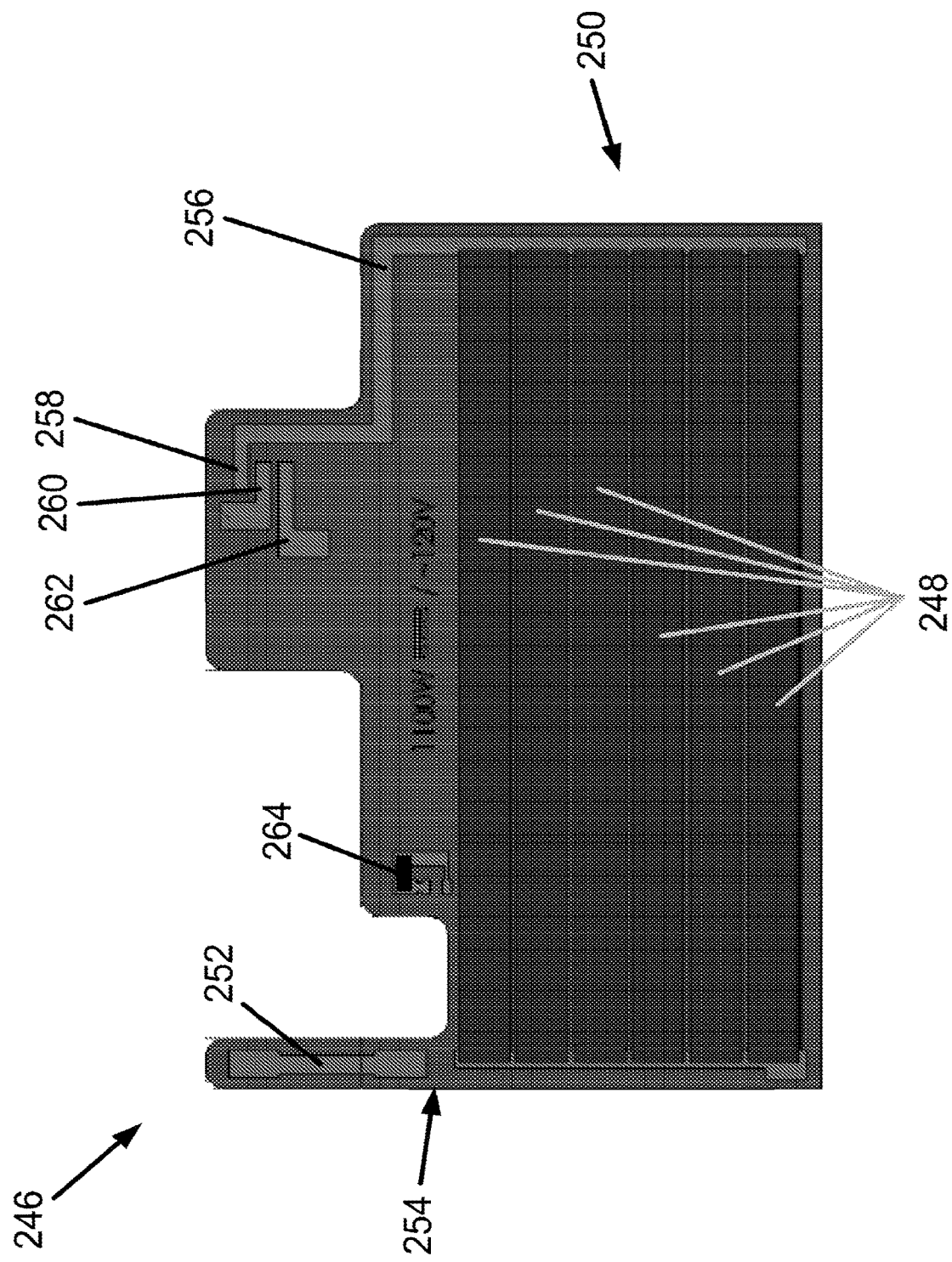
FIG. 19 is a plan view of a flexible circuit board of a heater of the thermal immersion circulator of FIG. 16, according to at least one illustrated embodiment.

FIG. 19 illustrates a flexible circuit board 246 that can be coupled to the exterior surface of the heater 202. The flexible circuit board 246 can have components and features that are similar to those of the flexible circuit board 122. The flexible circuit board 246 includes a plurality (six, in the illustrated embodiment) of resistive bands 248, which together form a heating element 250. The flexible circuit board 246 includes a neutral pathway 252 that is electrically separated from a first end of each of the resistive bands 248 by a gap 254. The gap 254 can be bridged by a thermal fuse, such as a UL® thermal device, that breaks or trips at a predetermined temperature.

As one example, the thermal fuse can be electrically coupled to the neutral pathway 252 and to a terminal located at an edge of the heating element 250 opposite to the neutral pathway 252 across a width of the heating element 250 (i.e., at the bottom of the heating element 250 as it is illustrated in FIG. 19). As another example, the thermal fuse can include a spring that biases leads from the neutral pathway 252 and the first ends of the resistive bands 248 apart from one another. The thermal fuse can include a conductive element that physically and electrically couples the leads to one another against the action of the spring, and that melts at a predetermined temperature. Once the conductive element melts, the spring can open the circuit across the gap 254 and between the neutral pathway 252 and the heating element 250.

The flexible circuit board 246 also includes a switched power line 256 that electrically couples a second end of each of the resistive bands 248 to each other and to a switched power terminal 258. The flexible circuit board 246 also includes an active terminal 260 adjacent to but electrically separated from the switched power terminal 258, for which the neutral pathway 252 can serve as a return path. The flexible circuit board 246 also includes a gate 262 adjacent to but electrically separated from the active terminal 260. Based on their respective configurations, the flexible circuit board 246 can be referred to as a "one-zone" flexible circuit board and the heater 202 including the flexible circuit board 246 can be referred to as a "one-zone" heater, whereas the flexible circuit board 122 can be referred to as a "two-zone" flexible circuit board and the heater 100 can be referred to as a "two-zone" heater.

The flexible circuit board 246 can be provided with a 120 voltage across the resistive bands 248, which can produce 1100 watts. Power to the resistive bands 248 can be cycled on and off over time to provide a desired time-averaged power, such as a time-averaged power less than 1100 watts. The flexible circuit board 246 can also include a thermistor 264, which can be used in the same ways as any of the other thermistors described herein. As another example, however, the thermistor 264 can be used to determine that the circulator 200 has been removed from a body of fluid. For example, a rate of change of the temperature measured by the thermistor 264 can be smaller when the circulator 200 is immersed in a body of a fluid than when the circulator 200 is removed from the body of the fluid. A threshold value for the rate of change of the temperature measured by the thermistor 264 can be pre-determined based on this difference so that when the rate of change of the temperature measured by the thermistor 264 exceeds the threshold, the heater 202 is turned off to prevent overheating. The thermistor 264 can be a surface mount, 0805 form factor thermistor coupled to traces formed in the flexible circuit board 246, which can be electrically coupled to the printed circuit board and electronics 208.

Figure 20:
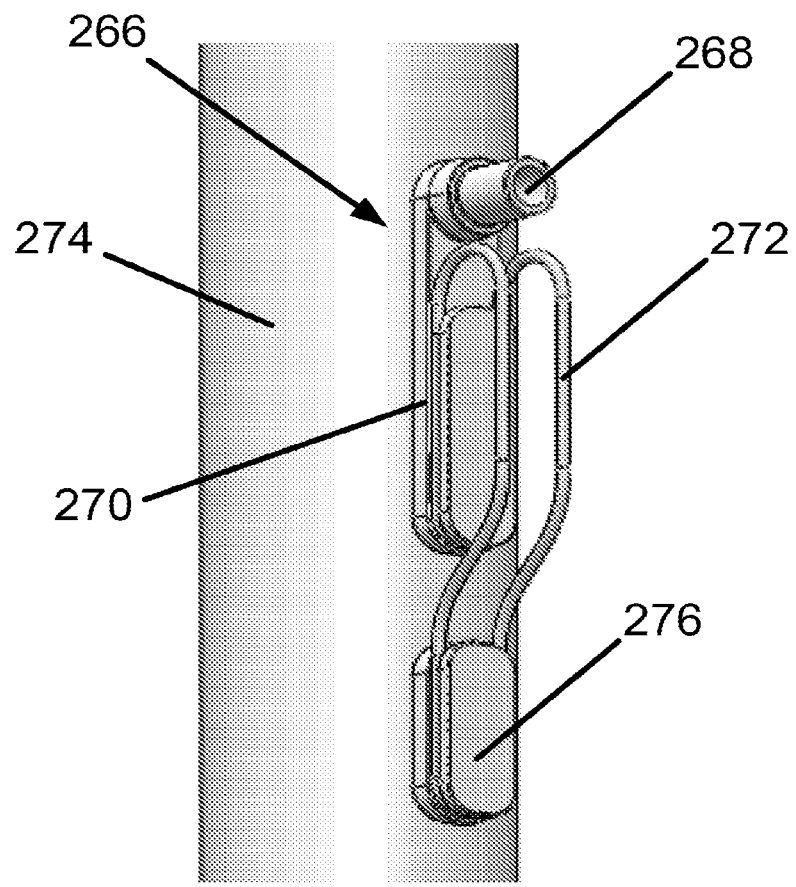
FIG. 20 is a side view of the thermal immersion circulator of FIG. 16, according to at least one illustrated embodiment.

FIG. 20 illustrates a support 266 that includes a grommet or boss 268 extending outwardly from the top of the support and a groove 270 extending down along a first side of the support, across a bottom of the support, and up along a second side of the support. Support 266 can be used to mount a power cord (e.g., cord 32 or cord 222) and a removable spring clip 272 to a housing 274 of a thermal immersion circulator. For example, a strain relief element at the end of a power cord, such as a strain relief element having a diameter that increases toward the end of the cord, can be coupled to the boss 268. As another example, the clip 272 can include a wire (which can be stainless steel or any other suitable material) having a shape to mate with the groove 270 to hold the clip 272 to the support 266 by friction, such as in an interference fit. Thus, the clip 272 can be easily removed from the support 266 and replaced with another clip, if desired. The clip 272 can also include a molded pad 276 to bear against the side of the pot such that the side of the pot can be clamped between the housing 274 and the pad 276 by a biasing action of the clip 272.

In some implementations, a kit can include a thermal immersion circulator and a plurality of clips having different sizes, each of the clips configured for use with pots of different dimensions, e.g., having sides of different diameters. Before using the thermal immersion circulator, a user can assess the dimensions of the pot it is to be used with, select a clip based on those dimensions, couple the selected clip to the thermal immersion circulator, and then begin using the thermal immersion circulator. Incorporating the boss 268 and the groove 270 into a single component, the support 266, can reduce expenses by combining the connections for multiple items (a power cord and a clip) into a single component. Because the boss 268 is located at the top of the support 266, that is, above the groove 270, a power cord is coupled to the thermal immersion circulator above the clip. Thus, by clipping the thermal immersion circulator to the side of a pot, a user can ensure that the power cord remains out of the body of fluid being heated.

Figure 21:
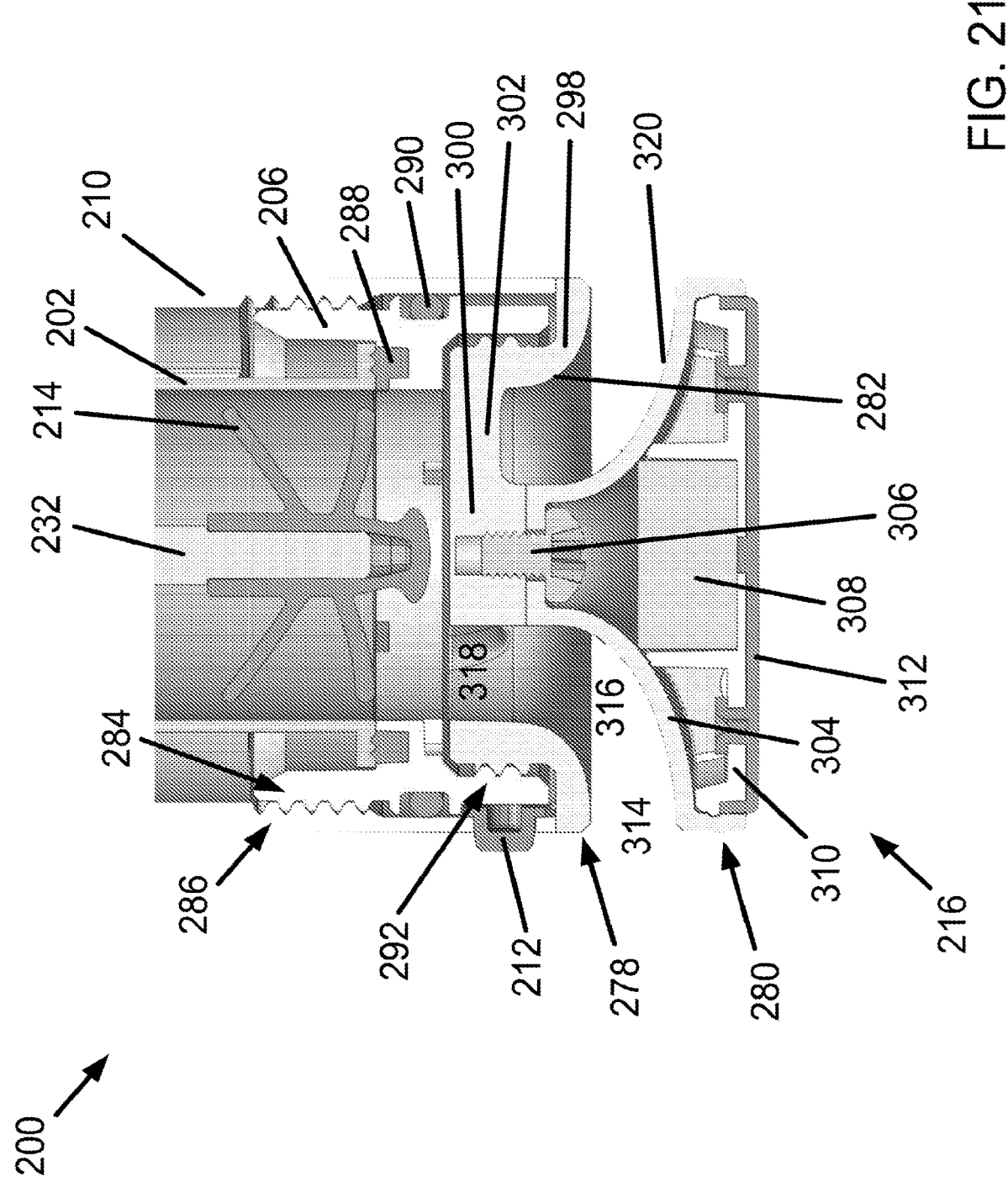
FIG. 21 is a cross-sectional side view of components of the thermal immersion circulator of FIG. 16, according to at least one illustrated embodiment.

FIG. 21 is a cross-sectional view of several components of the thermal immersion circulator 200. As shown in FIG. 21, the coupling nut 206 can have external threads 284 that engage with complementary internal threads 286 of the housing 210 to secure the coupling nut 206 to the housing 210 and to secure the heater 202 and other components within the housing 210. The coupling nut 206 can also include an inner seal 288 that can seal the interior of the heater 202 to the coupling nut 206 to prevent ingress of fluid from within the heater 202 to the rest of the thermal immersion circulator 200. The coupling nut 206 can also include an outer seal 290 that can seal the interior of the housing 210 to the coupling nut 206 to prevent ingress of fluid from outside the circulator 200 to the rest of the thermal immersion circulator 200. The coupling nut 206 can also include internal threads 292 into which complementary external threads of the inlet 216 can be screwed to secure the inlet 216 to the other components of the thermal immersion circulator 200. The coupling nut 206 and its seals 288 and 290 can allow a user to remove the inlet 216 to access the interior of the heater 202, such as to clean the heater 202, without breaking a seal of the thermal immersion circulator 200.

FIG. 21 also illustrates that the housing bumper 212 can be mounted so that a peripheral flange of the housing bumper 212 engages an interior surface of the housing 210 to maintain the housing bumper 212 within the housing 210. The housing bumper 212 can extend out of the housing 210 through an opening in the housing 210, such that a body of the housing bumper 212 protrudes beyond an exterior surface of the housing 210. The housing bumper 212 can be positioned below the seal 290 of the coupling nut 206 such that the opening in the housing 210 through which the housing bumper 212 extends does not break the seal of the thermal immersion circulator. As shown in FIG. 16, the housing bumper 212 can be positioned on the same side of the circulator 200 as the clip 224, which can be positioned on the opposite side of the circulator 200 from an opening 294 in the side of the housing 210 and a corresponding opening 296 in the side of the heater 202.

The housing bumper 212 can comprise a material that has a higher coefficient of friction than the housing 210 and that is more flexible than the housing 210. Thus, when a user clips the thermal immersion circulator 200 to a side of a pot, the body of the housing bumper 212 extending through the opening in the housing 210 can rest against the side of the pot, such that the housing 210 is separated and not in contact with the side of the pot. Thus, vibrations from the motor 204 and impeller 214 are not transmitted directly (or are at least transmitted more indirectly) to the pot. Further, the higher coefficient of friction of the housing bumper 212 reduces movement of the circulator 200 with respect to the side of the pot, such chatter of the circulator 200 resulting from the vibrations of the motor 204 and impeller 214. Further, when a user clips the thermal immersion circulator 200 to a side of a pot, the opening 294 in the side of the housing 210 and the opening 296 in the side of the heater 202 can face away from the side of the pot, improving fluid dynamics of the fluid as it leaves the thermal immersion circulator 200.

FIG. 21 also illustrates that the inlet 216 can include an upper flow guide 278 which can define an upper and outer flow boundary surface 282 for fluid entering the circulator 200 through the inlet 216, and a lower flow guide 280 which can define a lower and inner flow boundary surface 320 for the fluid entering the circulator 200 through the inlet 216. The upper flow guide 278 can include an outer rim portion 298 coupled to an inner hub portion 300 by a plurality (e.g., three) spokes or struts 302 (also shown in FIG. 16). Each of the struts 302 can extend radially inward and outward between the inner hub portion 300 and the outer rim portion 298, and can have an airfoil-shaped body. In some implementations, each of the struts 302 is also pitched at an angle, or has a generally helical shape about the inner hub portion 300, so that the struts 302 form a stationary propeller or an inductor that has a pitch or an angle of attack that is oriented in the same direction, or that is oriented in the opposite direction, as the pitch or angle of attack of the blades of the impeller 214.

The lower flow guide 280 can include an outer shell 304 which can be coupled to the hub 300 of the upper flow guide 278, such as by a fastener such as a screw 306, by an adhesive, or in any other suitable way. In some implementations, the upper flow guide 278 can be formed integrally with the lower flow guide 280. The lower flow guide 280 can also include frame 310, which can be clipped into or otherwise coupled to the shell 304, a magnet 308, which can be retained between the shell 304 and the frame 310, and an anti-slip pad 312, which can be clipped into or otherwise coupled to the frame 310.

When the thermal immersion circulator 200 is in use, the motor 204 can be operated to turn the impeller 214 to draw the fluid being heated into the circulator 200 inward through an entrance 314 of the inlet 216, inward and upward through a flow path 316 of the inlet 216, upward through an exit 318 of the inlet 216, and into the heater 202. The entrance 314 can extend 360° around the inlet 216 to improve fluid ingestion of the inlet 216. The flow path 316 can be bounded on its upper and outer sides by the upper and outer flow boundary surface 282 of the upper flow guide 278, and on its lower and inner sides by the lower and inner flow boundary surface 320 of the lower flow guide 280. The exit 318 can be segmented into three smaller exits by the struts 302, and the combination of these three smaller exits can be referred to collectively as the exit 318.

The upper and outer flow boundary surface 282 and the lower and inner flow boundary surface 320 can have profiles comprising b-splines and can be curvature continuous to improve fluid dynamics of the fluid being heated as it flows through the inlet 216. The cross sectional area of the flow path 316 can decrease as the flow path 316 extends inward and upward. For example, a contraction ratio of the flow path 316, which can correspond to a ratio of the cross sectional area of the entrance 314 extending 360° around the inlet 216 to the cross sectional area of the exit 318, can be greater than 1.0, can be between 1.6 and 2.4, and, as a specific example, can be 2.0. Further, a contraction ratio of a flow path through the heater 202, which can correspond to a ratio of the area of the opening at the bottom of the heater 202 to the area of the opening 296 in the side of the heater 202, can be between 4 and 7, or about 5.25. Such features can reduce cavitation and noise generated by the circulator 200 by reducing the magnitudes of pressure gradients that develop in the fluid as it flows through the inlet 216.

The inlet 216 allows the circulator 200 to stand vertically in a pot while resting on the anti-slip pad 312, which can be formed from silicone to reduce the chance of the circulator 200 falling over in the pot, and allows the circulator 200 to be held to the pot by the magnet 308, such as shown for the circulator 10 in FIG. 22. In such an embodiment, the clip 272 can be omitted, as also shown for the circulator 10 in FIG. 22. In such an embodiment, the magnet 308 can be attracted to a ferromagnetic material in the pot. In alternative implementations, the pot or an additional component, such as a pedestal coupled to the pot, can include a magnet and the circulator 200 can include a ferromagnetic material, such as in the place of the magnet 308. In some specific implementations, the magnet 308 can be a neodymium magnet and can be cylindrical with a height and a diameter, wherein a ratio of the height to the diameter is at least 0.4.

The inlet 216 also provides an entrance 314 to the circulator at a relatively low elevation so that fluid can be drawn into the circulator 200 even when a fluid level of the fluid being heated is relatively low. The entrance 314 can also have a height, or a distance between the upper flow guide 278 and the lower flow guide 280, matching or slightly smaller than a diameter of the power cord 222 or an outer sheathing of the power cord 222. Thus, when a user is not using the circulator 200, the power cord 222 can be wound around the housing 210 and positioned snugly within the opening 314, such that the power cord 222 is held within the entrance 314 by friction, such as in an interference fit between the inlet 216 and the power cord 222.

Any of the thermal immersion circulators described herein can be controlled in any of various suitable ways. For example, a thermal immersion circulator can be communicatively coupled with a source of instructions or commands, for example communicatively coupled with a control subsystem, a terrestrial or satellite broadcaster, or RF or NFC beacons. The communicative coupling can be tethered (i.e., wires, optical fiber, cable(s)). The communicative coupling can be untethered (i.e., radio frequency or microwave frequency transmitters, receivers and/or radios; infrared transmitters and/or receivers).

A thermal immersion circulator may include one or more receivers or ports to receive communications. For example, a thermal immersion circulator can include a USB compliant port to receive communications. The port can be accessible from the exterior of a housing of the thermal immersion circulator. The port can advantageously facilitate communicative coupling between the thermal immersion circulator and an external source of signals or information, for example via one or more wires, ribbon cables, optical fibers, or cables. Such can be used to provide control signals from the external source to the thermal immersion circulator to control operation of the thermal immersion circulator.

A thermal immersion circulator can include a port or receiver or connector or receptacle to receive control signals or other input. For example, a thermal immersion circulator can include a wired port or wired receiver (e.g., Ethernet®, USB®, Thunderbolt®, Lighting®, electrical or optical signaling) to receive signals from an external source. Also for example, a thermal immersion circulator can include a wireless port or wireless receiver (e.g., receiver, transceiver, radio, 802.11 compliant, BLUETOOTH®, WI-FI®, radio frequency, microwave frequency or infrared signaling) to wirelessly receive signals from an external source (e.g., smartphone, tablet computer, server computer, other processor-based device). For instance, a BLUETOOTH® compliant radio can provide short-range wireless communications therebetween. A thermal immersion circulator can include one or more antennas (e.g., stripline RF antenna) for wireless communications.

In some implementations, a thermal immersion circulator can include an internal, integrated input controller, such as coupled to a printed circuit board thereof. Input received by the thermal immersion circulator, by any one of the input methods described herein, can include instructions or commands to turn on a heater of the circulator, to turn off the heater of the circulator, to heat a fluid to a desired temperature, to heat a fluid for a desired amount of time, to heat a fluid to a plurality of different temperatures for a plurality of different times in sequence, or to follow any other suitable sequence of instructions.

The thermal immersion circulator 10 and the thermal immersion circulator 200 can be used in various applications. In general, the thermal immersion circulators described herein can be used to heat or circulate a body of any fluid that can safely flow through the thermal immersion circulator. As one specific example, the thermal immersion circulators described herein can be used in sous vide food cooking, a technique that cooks food at lower than typical temperatures (e.g., 150-160° F.) for longer than typical times. As another example, the thermal immersion circulators described herein can be used in laboratory settings, such as in environmental, microbiological, or other laboratories.

Those of skill in the art will recognize that many of the methods or algorithms set out herein may employ additional acts, may omit some acts, and/or may execute acts in a different order than specified. The various embodiments described above can be combined to provide further embodiments. U.S. Provisional Patent Application Ser. No. 62/021,530, filed Jul. 7, 2014, U.S. Provisional Patent Application Ser. No. 62/095,669, filed Dec. 22, 2014, U.S. Provisional Patent Application Ser. No. 62/110,228, filed Jan. 30, 2015, U.S. Provisional Patent Application Ser. No. 62/195,199, filed Jul. 21, 2015, U.S. patent application Ser. No. 14/789,414, filed Jul. 1, 2015, and U.S. provisional patent application No. 62/242,864, filed Oct. 16, 2015, are incorporated herein by reference, in their entirety. Aspects of the implementations can be modified, if necessary, to employ systems, circuits and concepts of the various patents, applications and publications to provide yet further implementations.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A thermal immersion circulator, comprising:
a main body having a tubular side wall comprising a first end and a second end spaced from the first end across a length of the main body;
an inlet proximate to the first end which a fluid is drawable therethrough;
an outlet through which the fluid is expellable from an interior of the thermal immersion circulator;
a flexible circuit board wrapped around an external surface of the main body between the inlet and the outlet, the flexible circuit board comprising a plurality of resistive bands forming a heating element that heats the fluid;
a motor mounted adjacent to the second end of the main body;
an impeller positioned inside the main body; and
a shaft that magnetically couples the motor to the impeller.

2. The thermal immersion circulator of claim 1, further comprising:
a first magnet directly physically coupled to the motor; and
a second magnet directly physically coupled to the shaft;
wherein the first and second magnet are magnetically coupled to one another;
wherein actuation of the motor directly drives rotation of the first magnet, wherein the rotation of the first magnet induces rotation of the second magnet, and wherein the rotation of the second magnet rotates the shaft and the impeller.

3. The thermal immersion circulator of claim 1, further comprising a switch electrically coupled to control the heating element and physically and thermally conductively coupled to the tubular side wall of the main body.

4. The thermal immersion circulator of claim 3, wherein the tubular side wall has an upper portion and a lower portion, the upper portion having a flat surface
upon which the switch is physically and thermally conductively mounted.

5. The thermal immersion circulator of claim 3, wherein the switch is an active power switch, wherein heat generated by the active power switch is transferred to fluid within a fluid flow passage in the tubular side wall.

6. The thermal immersion circulator of claim 5, wherein the switch is an encapsulated TRIAC.

7. The thermal immersion circulator of claim 1, wherein the inlet is at least proximate to a first end of the main body, and at least a portion of the outlet is spaced relative toward a second end of the main body with respect to at least a portion of the inlet.

8. The thermal immersion circulator of claim 7, wherein an entirety of the outlet is spaced relatively closer to second end than an entirety of the inlet.

9. The thermal immersion circulator of claim 7, wherein the tubular side wall forms the inlet at the first end.

10. The thermal immersion circulator of claim 1, wherein the flexible circuit board is wrapped angularly about at least three quarters of an external surface of the tubular side wall.

11. The thermal immersion circulator of claim 1, wherein the impeller is positioned closer to the inlet than to the outlet.

* * * * *